(12) United States Patent  (10) Patent No.: US 8,160,455 B2
Mahgerefteh et al.  (45) Date of Patent: Apr. 17, 2012

(54) METHOD AND APPARATUS FOR GENERATING SIGNALS WITH INCREASED DISPERSION TOLERANCE USING A DIRECTLY MODULATED LASER TRANSMITTER

(75) Inventors: Daniel Mahgerefteh, San Francisco, CA (US); Thelinh Nguyen, San Jose, CA (US); Xueyan Zheng, Andover, MA (US); Sunil Priyadarshi, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 27 days.

(21) Appl. No.: 12/566,471

(22) Filed: Sep. 24, 2009

(65) Prior Publication Data

US 2010/0098436 A1  Apr. 22, 2010

Related U.S. Application Data

(63) Continuation-in-part of application No. 12/017,957, filed on Jan. 22, 2008.

(60) Provisional application No. 61/099,806, filed on Sep. 24, 2008.

(51) Int. Cl.
*H04B 10/04* (2006.01)
(52) U.S. Cl. ........ 398/192; 398/193; 398/194; 398/195; 398/199
(58) Field of Classification Search .................. 398/182, 398/183, 192–199
See application file for complete search history.

(56) References Cited

U.S. PATENT DOCUMENTS

| | | |
|---|---|---|
| 3,324,295 A | 6/1967 | Harris |
| 3,973,216 A | 8/1976 | Hughes et al. |
| 4,038,600 A | 7/1977 | Thomas et al. |
| 4,561,119 A | 12/1985 | Epworth |
| 4,671,604 A | 6/1987 | Soref |
| 4,896,325 A | 1/1990 | Coldren |
| 4,908,883 A | 3/1990 | Chraplyvy et al. |
| 5,088,097 A | 2/1992 | Ono et al. |
| 5,119,393 A | 6/1992 | Oka et al. |
| 5,136,598 A | 8/1992 | Weller et al. |
| 5,170,402 A | 12/1992 | Ogita et al. |
| 5,177,630 A | 1/1993 | Goutzoulis et al. |
| 5,293,545 A | 3/1994 | Huber |
| 5,325,378 A | 6/1994 | Zorabedian |
| 5,325,382 A | 6/1994 | Emura et al. |
| 5,371,625 A | 12/1994 | Wedding et al. |

(Continued)

FOREIGN PATENT DOCUMENTS

CA 2510352 3/2010

(Continued)

OTHER PUBLICATIONS

Alexander et al., Passive Equalization of Semiconductor Diode Laser Frequency Modulation, Journal of Lightwave Technology, Jan. 11-23, 1989, vol. 7, No. 1.*

(Continued)

*Primary Examiner* — Kenneth N Vanderpuye
*Assistant Examiner* — Abbas H Alagheband
(74) *Attorney, Agent, or Firm* — Maschoff Gilmore & Israelsen

(57) ABSTRACT

An optical transmitter is disclosed wherein a signal processor receives a data stream and outputs a drive signal for a laser, where the drive signal encodes each bit of the data stream according to the values of adjacent bits effective to compensate for spreading of bits within the fiber. The output of the laser is input to an optical spectrum reshaper that outputs a signal having an enhanced extinction ratio.

19 Claims, 11 Drawing Sheets

U.S. PATENT DOCUMENTS

| | | | |
|---|---|---|---|
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A | 12/1997 | Onaka et al. | |
| 5,856,980 A | 1/1999 | Doyle et al. | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 5,991,323 A | 11/1999 | Adams et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri et al. | |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1 | 8/2001 | Logan et al. | |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks | |
| 6,359,716 B1 | 3/2002 | Taylor | |
| 6,421,151 B1 | 7/2002 | Berger | |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,690,686 B2 | 2/2004 | Delfyett et al. | |
| 6,738,398 B2 | 5/2004 | Hirata | |
| 6,778,307 B2 | 8/2004 | Clark | |
| 6,785,308 B2 | 8/2004 | Dyer et al. | |
| 6,807,215 B2 | 10/2004 | Lam et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 | 4/2006 | May | |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati | |
| 7,356,264 B2 | 4/2008 | Mahgerefteh et al. | |
| 7,376,352 B2 | 5/2008 | Tayebati | |
| 7,406,266 B2 * | 7/2008 | Mahgerefteh et al. | 398/186 |
| 7,406,267 B2 | 7/2008 | Mahgerefteh et al. | |
| 7,433,605 B2 | 10/2008 | Mahgerefteh et al. | |
| 7,474,858 B2 | 1/2009 | Lee et al. | |
| 7,474,859 B2 | 1/2009 | Mahgerefteh et al. | |
| 7,477,851 B2 | 1/2009 | Mahgerefteh et al. | |
| 7,480,464 B2 | 1/2009 | McCallion et al. | |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 7/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 | 12/2009 | Zheng et al. | |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,756,421 B2 * | 7/2010 | Roberts et al. | 398/158 |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,840,140 B2 * | 11/2010 | Gottwald | 398/193 |
| 7,860,404 B2 | 12/2010 | Matsui et al. | |
| 2001/0012430 A1 | 8/2001 | Usami et al. | |
| 2001/0048705 A1 | 12/2001 | Kitaoka et al. | |
| 2002/0012369 A1 | 1/2002 | Nasu et al. | |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0131047 A1 | 9/2002 | Zarrabian et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 | 8/2003 | Kang et al. | |
| 2003/0161370 A1 | 8/2003 | Buimovich et al. | |
| 2003/0169787 A1 | 9/2003 | Vergaftman et al. | |
| 2003/0193974 A1 | 10/2003 | Frankel et al. | |
| 2003/0210912 A1 | 11/2003 | Leuthold et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |
| 2004/0218890 A1 | 11/2004 | Mahgerefteh et al. | |
| 2004/0234200 A1 | 11/2004 | Jennings et al. | |
| 2005/0100345 A1 | 5/2005 | Welch et al. | |
| 2005/0111852 A1 | 5/2005 | Mahgerefteh et al. | |
| 2005/0152702 A1 | 7/2005 | Mahgerefteh et al. | |
| 2005/0163512 A1 | 7/2005 | Tayebati et al. | |
| 2005/0169638 A1 | 8/2005 | Tayebati et al. | |
| 2005/0169642 A1 | 8/2005 | Mahgerefteh et al. | |
| 2005/0175356 A1 | 8/2005 | McCallion et al. | |
| 2005/0191059 A1 * | 9/2005 | Swenson et al. | 398/159 |
| 2005/0196177 A1 | 9/2005 | Moran | |
| 2005/0206989 A1 | 9/2005 | Marsh | |
| 2005/0213993 A1 | 9/2005 | Kazemi-Nia et al. | |
| 2005/0226631 A1 * | 10/2005 | Thomson et al. | 398/149 |
| 2005/0249509 A1 | 11/2005 | Nagarajan et al. | |
| 2005/0271394 A1 | 12/2005 | Whiteaway et al. | |
| 2005/0286829 A1 | 12/2005 | Mahgerefteh et al. | |
| 2005/0286909 A1 | 12/2005 | Kish, Jr. et al. | |
| 2006/0002718 A1 | 1/2006 | Matsui et al. | |

| | | | |
|---|---|---|---|
| 2006/0008272 A1 | 1/2006 | Abeles et al. | |
| 2006/0018666 A1 | 1/2006 | Matsui et al. | |
| 2006/0029358 A1 | 2/2006 | Mahgerefteh et al. | |
| 2006/0029396 A1* | 2/2006 | Mahgerefteh et al. | |
| 2006/0029397 A1* | 2/2006 | Mahgerefteh et al. | |
| 2006/0078336 A1* | 4/2006 | McNicol et al. ............. | 398/147 |
| 2006/0078338 A1 | 4/2006 | Johnson et al. | |
| 2006/0120416 A1 | 6/2006 | Hu et al. | |
| 2006/0193636 A1 | 8/2006 | Katagiri et al. | |
| 2006/0228120 A9* | 10/2006 | McCallion et al. | |
| 2006/0233556 A1* | 10/2006 | Mahgerefteh et al. | |
| 2006/0239306 A1 | 10/2006 | Donohoe | |
| 2006/0274993 A1* | 12/2006 | Mahgerefteh et al. | |
| 2007/0286608 A1* | 12/2007 | Matsui et al. | |
| 2008/0002990 A1* | 1/2008 | McCallion | |
| 2008/0037608 A1 | 2/2008 | Zhou et al. | |
| 2008/0159747 A1 | 7/2008 | Mahgerefteh et al. | |
| 2008/0166134 A1 | 7/2008 | McCallion et al. | |
| 2008/0181619 A1 | 7/2008 | Heismann | |
| 2008/0187325 A1 | 8/2008 | McCallion et al. | |
| 2008/0193132 A1 | 8/2008 | Matsui et al. | |
| 2008/0193144 A1 | 8/2008 | Zhou et al. | |
| 2008/0240180 A1 | 10/2008 | Matsui et al. | |
| 2008/0247763 A1 | 10/2008 | Mahgerefteh et al. | |
| 2008/0247765 A1 | 10/2008 | Mahgerefteh et al. | |
| 2008/0291950 A1 | 11/2008 | McCallion et al. | |
| 2009/0003842 A1 | 1/2009 | Mahgerefteh et al. | |
| 2009/0060526 A1 | 3/2009 | Matsui et al. | |
| 2009/0080905 A1 | 3/2009 | Olsson | |
| 2009/0196631 A1 | 8/2009 | Daghighian et al. | |
| 2009/0238224 A1 | 9/2009 | Ye | |
| 2009/0269069 A1 | 10/2009 | Mahgerefteh et al. | |
| 2010/0008679 A1 | 1/2010 | Cole | |
| 2010/0279447 A1 | 11/2010 | Matsui et al. | |
| 2010/0311195 A1 | 12/2010 | Matsui et al. | |

FOREIGN PATENT DOCUMENTS

| | | | |
|---|---|---|---|
| CN | 1236891 | | 12/1999 |
| CN | 200380108289.9 | | 11/2007 |
| CN | 200380108289.9 | | 8/2008 |
| CN | 200380108289.9 | | 11/2008 |
| CN | 200580015245.0 | | 9/2009 |
| CN | 200580012705.4 | | 3/2010 |
| CN | 200580015245.0 | | 3/2010 |
| CN | 2005800378071 | | 5/2010 |
| CN | 20080009551.7 | | 7/2010 |
| EP | 0524758 | | 7/1992 |
| EP | 0602659 | * | 6/1994 |
| EP | 05731268.8 | | 1/2008 |
| EP | 05764209.2 | | 6/2009 |
| EP | 05731268.8 | | 5/2010 |
| GB | 2 107 147 | * | 4/1983 |
| JP | 58-075340 | | 5/1983 |
| JP | 62-189832 | | 8/1987 |
| JP | 09-214427 | | 8/1997 |
| JP | 11-031859 | | 2/1999 |
| JP | 2000105313 | | 4/2000 |
| JP | 2001-036477 | | 2/2001 |
| JP | 2001-284711 | | 10/2001 |
| JP | 2001291928 | | 10/2001 |
| JP | 2001320328 | | 11/2001 |
| JP | 2002243935 | | 8/2002 |
| JP | 2002267834 | | 9/2002 |
| JP | 2002267998 | | 9/2002 |
| JP | 2002-311235 | | 10/2002 |
| JP | 2004-551835 | | 7/2008 |
| JP | 2004-551835 | | 3/2010 |
| JP | 2009-504345 | | 4/2010 |
| JP | 2009-504345 | | 10/2010 |
| KR | 102008-7027139 | | 4/2010 |
| WO | 9905804 | * | 2/1999 |
| WO | 0104999 | * | 1/2001 |
| WO | WO 0117076 | | 3/2001 |
| WO | WO 0118919 | | 3/2001 |
| WO | 03005512 | * | 7/2002 |

OTHER PUBLICATIONS

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.*

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.*

Hyryniewicz, J.V., et al., Higher Order Filter Response in Coupled Microring Resonators, IEEE Photonics Technology Letters, Mar. 2000, 320-322, vol. 12, No. 3.*

Koch, T. L. et al., Nature of Wavelength Chirping in Directly Modulated Semiconductor Lasers, Electronics Letters, Dec. 6, 1984, 1038-1039, vol. 20, No. 25/26.*

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Matsui, Y., et al. Chirp-managed directly modulated laser (CML), IEEE Photonics Technology Letters, vol. 18, No. 2, Jan. 15, 2006, pp. 385-387.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Nakahara, K. et al., 40-Gb/s direct modulation with high extinction ratio operation of 1.3-um InGaA1As Multliquantum Well Ridge Waveguide Distributed Feeback Lasers, IEEE Photonics Technology Letters, vol. 19, No. 19, Oct. 1, 2007, pp. 1436-1438.

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Sato, K., et al. Chirp characteristics of 40-Gb/s directly modulated distributed-feedback laser diodes, Journal of Lightwave Technology, vol. 23, No. 11, Nov. 2005, pp. 3790-3797.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electroncis Letters, Jan. 6, 1994, 58-59, vol. 30, No. 1.

Wedding, B., et al., 10-Gb/s Optical Transmission up to km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength converter Using a Fiber Bragg Grating, Journal of Lightwave Technology, Feb. 1999, 308-315, vol. 17, No. 2.

U.S. Appl. No. 12/188,407 Office Action mailed Jun. 30, 2011.

U.S. Appl. No. 12/025,573 Notice of Allowance mailed Feb. 7, 2011.

U.S. Appl. No. 12/014,676 Supplemental Notice of Allowance mailed Jun. 29, 2011.

Dischler et al., Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA., Feb. 24, 2008.

Dong Jae Shin, et al., Low-cost WDM-PON with Colorless Bidirectional Tranceivers, Journal of Lightwave Technology, Jan. 2006, pp. 158-165, vol. 24, No. 1.

Freund et al, 30 Gbit/s RZ 8-PSK Transmission over 2800 km Standard Single Mode Fibre without Inline Dispersion Compensation, 2007, 3 pages.

Kikuchi, Nobuhiko et al., Experimental Demonstration of Incoherent Optical Multilevel Staggered-APSK (Amplitude- and PhaseShift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migrtation, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Sekine, Kenro et al., Advanced Multi-level Transmission Systems, Optical Fiber Communication/National Fiber Optic Engineers Conference, Feb. 24-28, 2008, 3 pages, San Diego, CA.

Tokle, Torger et al., Advanced Modulation Formats for Transmission Systems, Optical Fiber Communication/National Fiber Optic Engineers Conference, Feb. 24-28, 2008, 3 pages, San Diego, CA.

Wesstrom et al., State-of-the-art performance of widely tunable modulated grating Y-Branch lasers; Optical Fiber Communication Conference, 2004. OFC 2004, vol. 1, No., pp. 2 vol. (1800), Feb. 23-27, 2004; doi: 10.1109/OFC.2004.1349295.

U.S. Appl. No. 11/964,315, filed Aug. 25, 2010, Office Action.
U.S. Appl. No. 11/964,315, filed Feb. 4, 2011, Notice of Allowance.
U.S. Appl. No. 11/964,321, filed Aug. 25, 2010, Office Action.
U.S. Appl. No. 11/964,321, filed Dec. 29, 2010, Notice of Allowance.
U.S. Appl. No. 12/014,676, filed Oct. 4, 2010, Office Action.
U.S. Appl. No. 12/014,676, filed Mar. 18, 2011, Notice of Allowance.
U.S. Appl. No. 12/017,957, filed Nov. 5, 2010, Office Action.
U.S. Appl. No. 12/017,957, filed Apr. 25, 2011, Office Action.
U.S. Appl. No. 12/025,573, filed Oct. 6, 2010, Office Action.
U.S. Appl. No. 12/028,675, filed Oct. 27, 2010, Office Action.
U.S. Appl. No. 12/028,675, filed Mar. 24, 2011, Notice of Allowance.
U.S. Appl. No. 12/028,678, filed Dec. 8, 2010, Office Action.
U.S. Appl. No. 12/028,678, filed May 16, 2011, Notice of Allowance.
U.S. Appl. No. 12/047,017, filed Jun. 1, 2010, Restriction Requirement.
U.S. Appl. No. 12/047,017, filed Aug. 6, 2010, Office Action.
U.S. Appl. No. 12/047,017, filed Sep. 27, 2010, Notice of Allowance.
U.S. Appl. No. 12/053,344, filed Apr. 1, 2010, Office Action.
U.S. Appl. No. 12/053,344, filed Sep. 3, 2010, Notice of Allowance.
U.S. Appl. No. 12/115,337, filed Mar. 4, 2010, Office Action.
U.S. Appl. No. 12/115,337, filed Aug. 20, 2010, Office Action.
U.S. Appl. No. 12/115,337, filed Oct. 28, 2010, Notice of Allowance.
U.S. Appl. No. 12/184,137, filed Dec. 2, 2010, Notice of Allowance.
U.S. Appl. No. 12/188,407, filed Mar. 2, 2011, Office Action.
U.S. Appl. No. 12/839,310, filed Apr. 28, 2011, Ex Parte Quayle Action.
U.S. Appl. No. 12/126,717, filed Apr. 7, 2011, Office Action.
U.S. Appl. No. 12/110,071, filed May 12, 2011, Office Action.

* cited by examiner

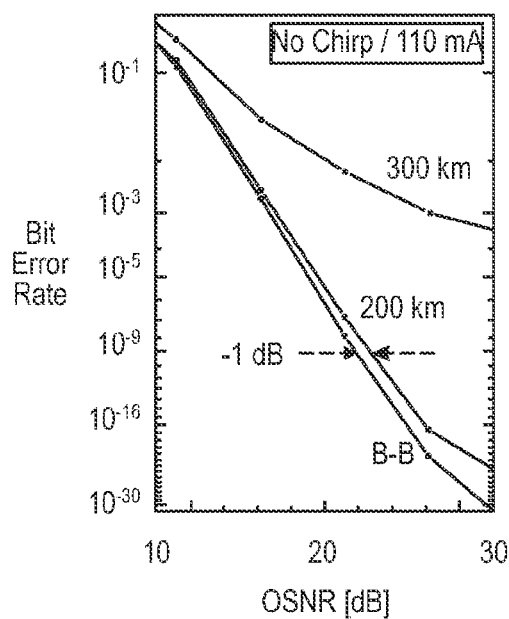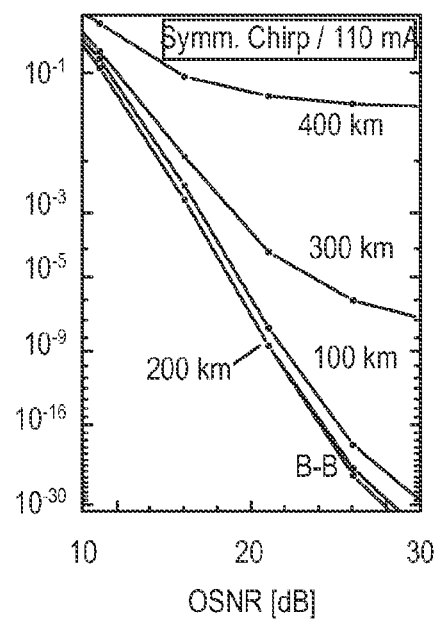
*Fig. 11A*  *Fig. 11B*
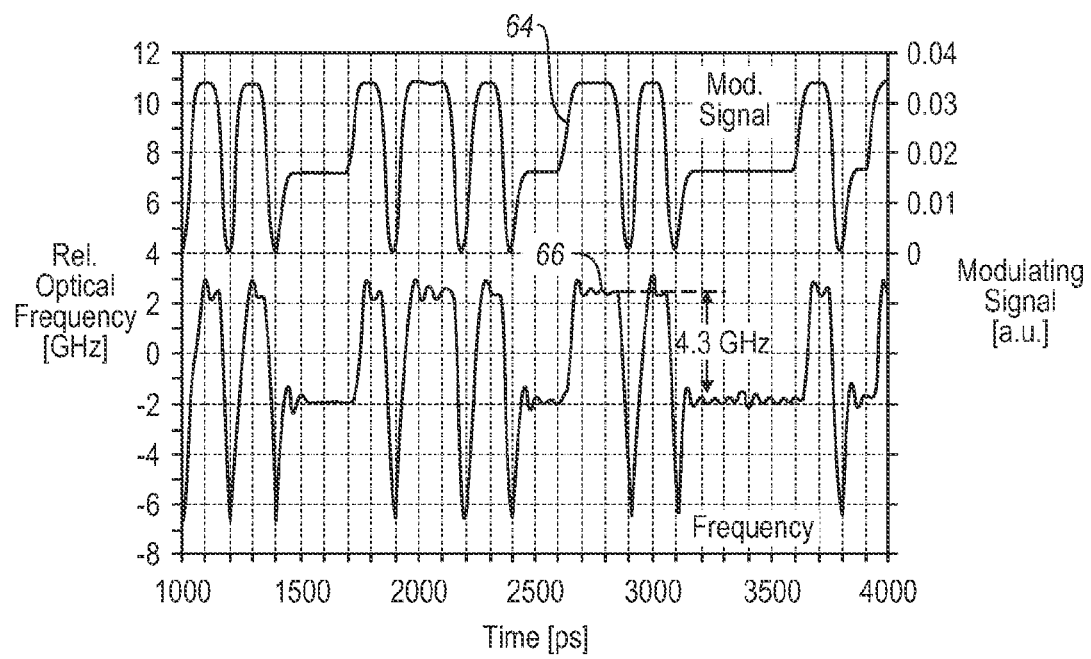
*Fig. 12*

METHOD AND APPARATUS FOR GENERATING SIGNALS WITH INCREASED DISPERSION TOLERANCE USING A DIRECTLY MODULATED LASER TRANSMITTER

CROSS-REFERENCE TO RELATED APPLICATIONS

This application is a continuation-in-part of U.S. patent application Ser. No. 12/017,957 filed Jan. 22, 2008, and entitled "Method and Apparatus for Generating Signals with Increased Dispersion Tolerance Using a Directly Modulated Laser Transmitter," which is hereby incorporated herein by reference in its entirety.

This application claims the benefit of U.S. Provisional Application Ser. No. 61/099,806, filed Sep. 24, 2008, and entitled, "Method and Apparatus for Generating Signals with Increased Dispersion Tolerance Using a Directly Modulated Laser Transmitter," which is hereby incorporated herein by reference in its entirety.

BACKGROUND OF THE INVENTION

1. The Field of the Invention

This application relates to optical transmitters.

2. The Relevant Technology

In optical communication systems, it is important that optical signals propagate through dispersive optical fiber without being severely distorted. The quality of a transmitted digital signal may be characterized by measuring the bit error rate (BER) of the signal in a receiver after propagation through a length of fiber and by determining the optical signal-to-noise ratio (OSNR) required at the receiver to obtain a certain BER, typically around $10^{-9}$ This OSNR is then compared with the OSNR required to obtain the same BER directly at the output of the transmitter, and the ratio of these two levels is called the dispersion penalty, which is often expressed in decibels (dB). The largest dispersion penalty that a fiber optic transmission system can tolerate without significant performance degradation is typically between 1 and 2 dB.

The amount of group-velocity dispersion (GVD) at which the dispersion penalty reaches the allowed value depends on the transmitted data rate and the modulation format. At a data rate of 10 Gb/s, for example, binary on-off keyed optical signals in NRZ format typically can tolerate up to about 1400 ps/nm GVD without incurring a dispersion penalty of more than 1 dB, thus allowing transmission over about 80 km of standard single-mode fiber at 1550 nm wavelength without needing optical or electrical dispersion compensation, whereas under the same conditions optical duobinary signals and signals generated by laser transmitters as described in U.S. patent application Ser. No. 10/289,944, filed on Nov. 6, 2002, application number US2005000037718, can tolerate accumulated GVD of up to 3400 ps/nm.

However, optical signals frequently need to be transmitted over distances for which the accumulated GVD in the fiber is substantially larger than 3400 ps/nm. A general solution for transmitting optical signals over such distances without exceeding the allowed dispersion penalty is to insert dispersion-compensating modules periodically along the optical transmission fiber. However, these dispersion-compensating modules are generally expensive and also increase the overall transmission loss in the system significantly. Alternatively, one may pre-distort the launched signals in the transmitter in such a way that the GVD in the dispersive fiber transforms them into the desired waveform required for error-tree detection at the receiver. This technique is known as electrical pre-compensation of the transmitted signals. However, such pre-compensation typically requires the use of an additional optical modulator in the transmitter, which also increases the cost and complexity of the system substantially.

It is well known to those skilled in the art that pre-compensation of the transmitted optical signals can substantially improve the distance over which the signals can be transmitted without requiring intermediate dispersion-compensating modules. However, electrical pre-compensation of signals in conventional modulation formats, such as on-off-keyed or phase-keyed signals in NRZ or RZ format, requires independent modulation of the optical amplitude and phase of the transmitted signal, and hence, two optical modulators that are driven by two independent electrical signals.

Alternatively, one may employ a directly modulated laser source together with an external modulator. Whereas in principle, such transmitters can pre-compensate arbitrarily large amounts of GVD, they tend to be expensive and consume substantially more electrical drive power than conventional optical transmitters because of additional electrical circuitry required for operating the two modulators. Therefore, transmitters generating electrically pre-compensated signals also add substantial cost and complexity to the system. This disadvantage is particularly important in systems where the accumulated GVD in the transmission fiber is only moderately larger than the dispersion tolerance of optical signals without pre-compensation.

BRIEF SUMMARY OF THE INVENTION

In one aspect of the invention an apparatus for transmitting optical signals includes a digital data source, an optical signal source, and a driving circuit coupled to the optical signal source. The driving circuit is configured to receive a data stream from the digital data source and to generate for each bit in the data stream a pulse having a shape that is a function of an n-bit window in the data stream including the bit.

In another aspect of the invention, the n-bit window has a length n corresponding to a memory of an optical channel coupled between the optical signal source and to an optical receiver. n may be an integer greater than $P\Delta v/T$, where P is the sum of dispersion times length for all portions of the optical channel, in picoseconds squared, between the optical receiver and optical signal source of the optical fiber channel, $\Delta v$ is the largest frequency deviation in the spectrum of an optical signal output the optical signal source, and T is the bit period, in picoseconds, of the data stream.

In another aspect of the invention, the optical signal source includes a laser optically coupled to an optical spectrum reshaper, the optical spectrum reshaper converting frequency modulation of the optical signal to amplitude modulation.

In another aspect of the invention, the driving circuit is configured to generate a pulse effective to induce transient chirp in the output of the optical signal source, the transient chirp being a function of the n-bit window.

In another aspect of the invention, the optical signal source is configured to output a frequency modulated signal corresponding to the drive signal and the driving circuit is configured to generate a phase relationship between one bits in the frequency modulated signal, the phase relationship being a function of the n-bit window.

In another aspect of the invention, the driving circuit is configured to generate a pulse effective to cause the optical signal source to output an optical signal having enhanced blue shifted transient chirp on a 0 to 1 transition of a 0110 bit sequence and to generate a pulse effective to cause the optical signal source to output an optical signal having enhanced red shifted transient chirp on a 1 to 0 transition of a 0110 bit sequence.

In another aspect of the invention, the driving circuit is configured to generate a pulse effective to cause the optical signal source to output an optical signal having a 1 to 0 transition between a peak frequency and a base frequency in a 1001 bit sequence, wherein the difference between the peak frequency and the base frequency is about equal to 0.75 times a bit rate of the data stream and having a 0 to 1 transition between a base frequency and a peak frequency in a 1001 bit sequence, wherein the difference between the peak frequency and the base frequency is about equal to 0.75 times a bit rate of the data stream.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 11A and 11B are plots relating the bit error rate of uncompensated optical signals and pre-compensated signals in accordance with an embodiment of the present invention;

FIG. 12 is a plot of a pre-compensated modulating signal including a time derivative component added only on the falling edges of the modulating signal and a corresponding output of a laser in accordance with an embodiment of the present invention;

DETAILED DESCRIPTION OF THE PREFERRED EMBODIMENTS

Figure 1:
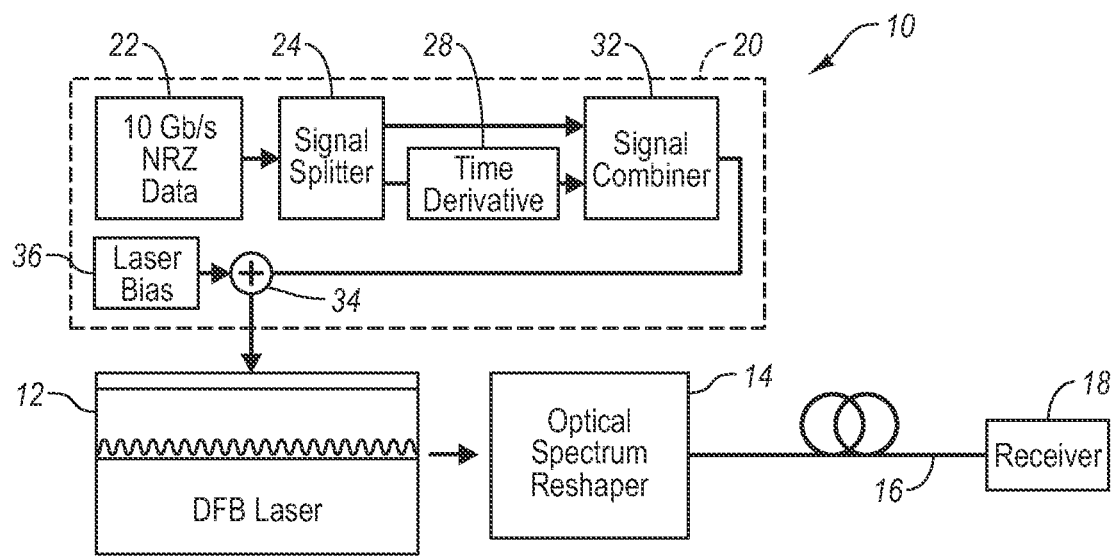
FIG. 1 is a schematic block diagram of a control circuit and laser in accordance with an embodiment of the present invention.

In some embodiments of the present invention, the dispersion tolerance of optical signals generated by transmitters is substantially improved, wherein the laser source is modulated with a pre-distorted electrical signal that is substantially different from the modulating signal used in conventional transmitters. The novel methods disclosed may be used with transmitters such as those disclosed in U.S. patent application Ser. No. 11/068,032, filed Feb. 28, 2005, and entitled "Optical System Comprising an FM Source and a Spectral Reshaping Element"; U.S. patent application Ser. No. 10/289,944, filed Nov. 6, 2002, and entitled "Power Source For a Dispersion Compensation Fiber Optic System"; U.S. patent application Ser. No. 10/308,522, filed Dec. 3, 2002, and entitled "High-Speed Transmission System Comprising a Coupled Multi-Cavity Optical Discriminator"; U.S. patent application Ser. No. 10/680,607, filed Oct. 6, 2003, and entitled "Flat Dispersion Frequency Discriminator"; and U.S. patent application Ser. No. 11/068,032, filed Feb. 28, 2005, and entitled "Optical System Comprising an FM Source and a Spectral Reshaping Element," which are all hereby incorporated by reference.

For purposes of this application, a conventional transmitter is one wherein a directly modulated laser emits a signal through an optical spectrum reshaper to enhance the amplitude modulation, pulse shape, and/or extinction ratio of adiabatically chirped pulses output by the laser.

The amplitude and phase of signals generated by such transmitters modulated in accordance with embodiments of the present invention substantially resemble those of pre-compensated optical signals. An important advantage of this method is that it does not require additional optical components in the transmitter or elsewhere in the system.

Transmitters modulated according to the method described herein below, preferably include a directly modulated laser and a passive optical filter, or optical spectrum reshaper (OSR). The OSR may be embodied as one or more filters, including, but not limited to, a coupled multi-cavity (CMC) filter, a periodic multi-cavity etalon, a fiber Bragg grating, a ring resonator filter, or any other optical element having a wavelength-dependent loss. The OSR may also comprise a fiber, a Gire-Tournois interferometer, or some other element with chromatic dispersion.

The laser in these transmitters is preferably operated well above its lasing threshold and modulated by a time-varying electrical signal that carries the digital information to be transmitted, typically an on-off-keyed signal in NRZ format. In response to this modulation, the optical frequency of the laser output signal varies in a continuous fashion with the amplitude of the modulating signal. This modulation is known as continuous-phase frequency modulation (CP-FM). In addition, the intensity of the laser output signal may also vary in response to the modulating signal, which is known as residual amplitude modulation (AM). However, the residual AM is usually small in such transmitters and, hence, will be neglected in the following description of the invention.

In an ideal CP-FM transmitter, the optical frequency of the laser changes proportionally to the amplitude variations in the modulating signal. This effect is referred to as adiabatic chirp. Practical lasers, however, may also exhibit additional frequency deviations that are not proportional to the amplitude variations in the modulating signal. These additional frequency deviations typically occur near the rising and falling edges of the modulating pulses and, hence, are referred to as transient chirp. The magnitude of this transient chirp is determined by the relaxation oscillation frequency of the laser, $f_r$, which, in turn, depends on the bias current applied to the active laser medium.

The transient chirp is particularly large when the laser is operated close to its lasing threshold. In experiments and through numerical simulations it has been found that transient chirp in the laser output can significantly improve the dispersion tolerance of the transmitted optical signals. However, to generate sufficiently large transient chirp in the laser output, the laser needs to be operated relatively close to its lasing threshold, which is generally undesirable for other reasons. Furthermore, the amount of transient chirp generated in the laser output is difficult to control and may vary substantially from one laser to another. Therefore, in the present invention we disclose a method and means for introducing electrically controllable frequency deviations in the laser output that are substantially equal to the frequency deviations caused by transient chirp. In the following, these electrically controlled frequency deviations shall be referred to as artificial transient chirp.

In a preferred embodiment of the invention, shown in FIG. 1, a transmitter 10 includes an optical signal source such as a laser 12. The output of the laser 12 is transmitted through an OSR 14 and an optical fiber 16 to a receiver 18. The optical fiber 16 typically includes a dispersive material and has an optical path length. A controller 20 is coupled to the laser 12 in order to modulate the laser to encode data in the output signal of the laser.

The laser 12 is operated at a point well above its lasing threshold and the gain in the active laser medium is modulated by the controller 20 in proportion to a prescribed combination of an NRZ signal to be transmitted and a signal that represents the first time derivative of the NRZ signal, so as to generate a desired combination of adiabatic chirp and artificial transient chirp in the laser output signal.

In another preferred embodiment of the invention, a desired combination of adiabatic chirp and artificial transient chirp is generated in the laser output signal by the controller 20 by modulating the gain in the active laser medium in proportion to a prescribed combination of the NRZ signal to be transmitted and a signal that represents both first and higher time derivatives of the modulating NRZ signal.

In some embodiments, the artificial transient chirp has a magnitude chosen according to an optical path length between the transmitter 12 and the receiver 18, such as the length of the optical fiber 16, such that the transient chirp substantially compensates for dispersion experienced by pulses traveling from the transmitter 12 to the receiver 18. For example, the artificial transient chirp may have a magnitude effective to substantially compensate for dispersion caused by the fiber 16. In some embodiments, the artificial transient chirp has a magnitude sufficient to compensate for between 80 and 120 percent of the dispersion experienced by the pulses travelling from the transmitter 12 to the receiver 18.

Figure 2:
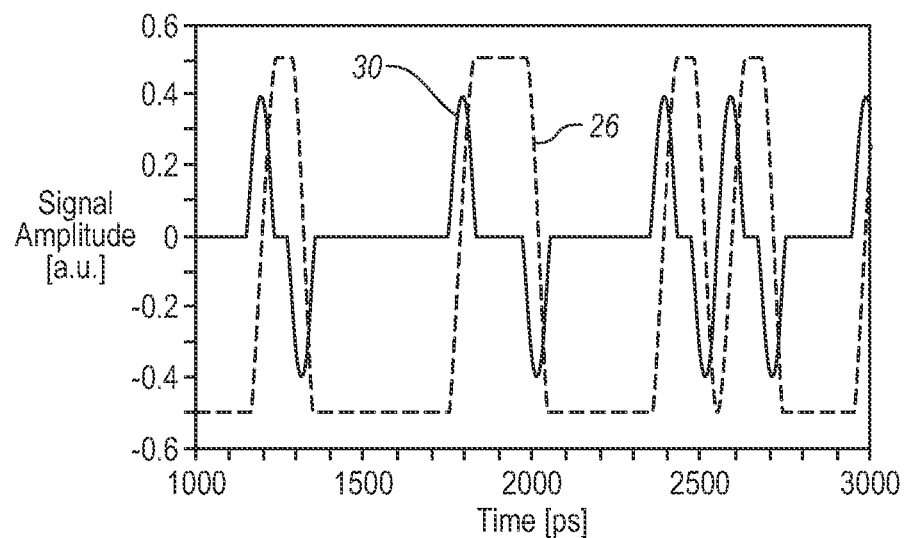
FIG. 2 is a plot of a modulating signal and a time derivative of the modulating signal in accordance with an embodiment of the present invention.

As shown in FIG. 1, a modulating signal may be generated by coupling a data signal from a digital signal source 22 to a signal splitter 24. The data signal may be an NRZ signal 26 such as is illustrated in FIG. 2. A portion of the data signal is input to a differentiator 28 that outputs a time derivative of the data signal, such as the time derivative 30 of FIG. 2. The time derivative signal 30 may be either a first order time derivative or a combination of a first order time derivative with higher order derivatives. The output of the differentiator 28 may be proportional but not necessarily equal to the time derivative, or derivatives, of the data signal. The data signal and the output of the differentiator 28 are then combined by a signal combiner 32. The output of the combiner is coupled to a summer 34 as is a laser bias signal source 36 providing a bias signal. The output of the summer is then input to the laser 12.

Figure 3:
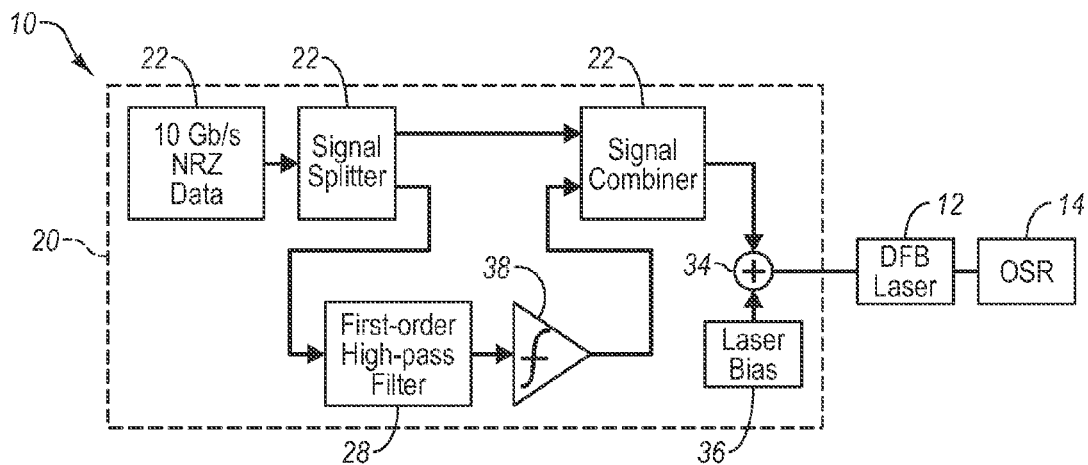
FIG. 3 is a schematic block diagram of an alternative embodiment of a control circuit and laser in accordance with an embodiment of the present invention.
Figure 4:
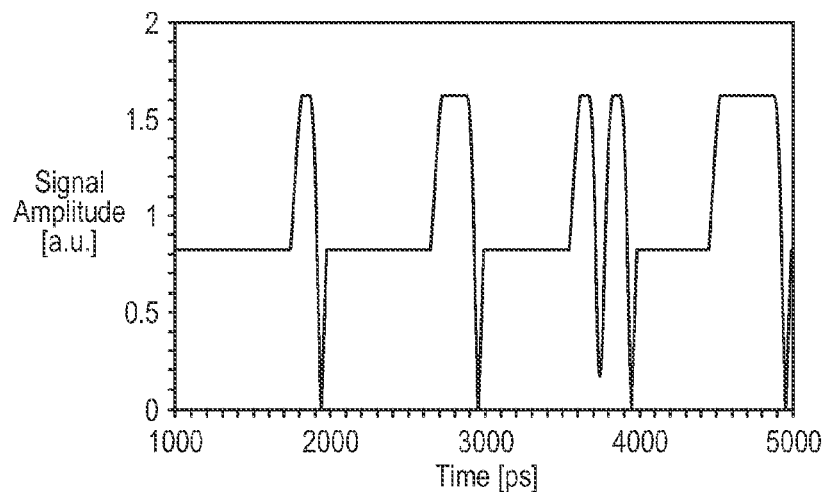
FIG. 4 is a plot of a pre-compensated signal including a time derivative component combined with a modulating signal only on the falling edges of the modulating signal in accordance with an embodiment of the present invention.

Referring to FIG. 3, in a third preferred embodiment of the invention, artificial transient chirp is generated in the laser output signal only during certain prescribed time intervals. For example, the time derivatives of the NRZ signal are added to the modulating signal only near the falling edges of the modulating NRZ pulses resulting in the signal of FIG. 4 in which artificial transient chirp occurs only near the falling edges of the NRZ signal. For example, a weighted half-rectified derivative of the modulated signal, having a non-zero magnitude only where the time derivative is negative, may be added to the modulating signal. Stated mathematically, the signal combined with the modulating signal is proportional to $H(-\dot{S}(t))$, where $\dot{S}(t)$ is the time derivative of the modulated signal and $H(x)$ is the Heaviside Step function.

In such embodiments, the controller 20 may include a threshold amplifier 38 that receives the output of the differentiator 28 and outputs only the negative time derivative occurring at the falling edges. The output of the threshold amplifier 38 is then recombined with the original data signal, such as by the summer 34 and input to the laser 12.

In some embodiments, the differentiator 28 may be embodied as a first order high-pass filter, as in the embodiment of FIG. 3. The first order high-pass filter may be embodied as a first-order Butterworth filter or a transversal electrical filter with two or more taps.

In another preferred embodiment of the invention, the magnitude of the adiabatic chirp in the laser output is substantially reduced compared to that in conventional transmitters used in combination with an OSR, which is typically 50% of the bit rate frequency (i.e. 5 GHz at a data rate of 10 Gb/s), so that said reduction of the adiabatic chirp further improves the dispersion tolerance of the transmitted signals when artificial transient chirp is added to the adiabatic chirp in the laser output. In one embodiment, the adiabatic chirp of the pulses is between 40 and 50% of the bit rate frequency. In another embodiment, the adiabatic chirp of the pulses is between 30 and 40% of the bit rate frequency.

Figure 5:
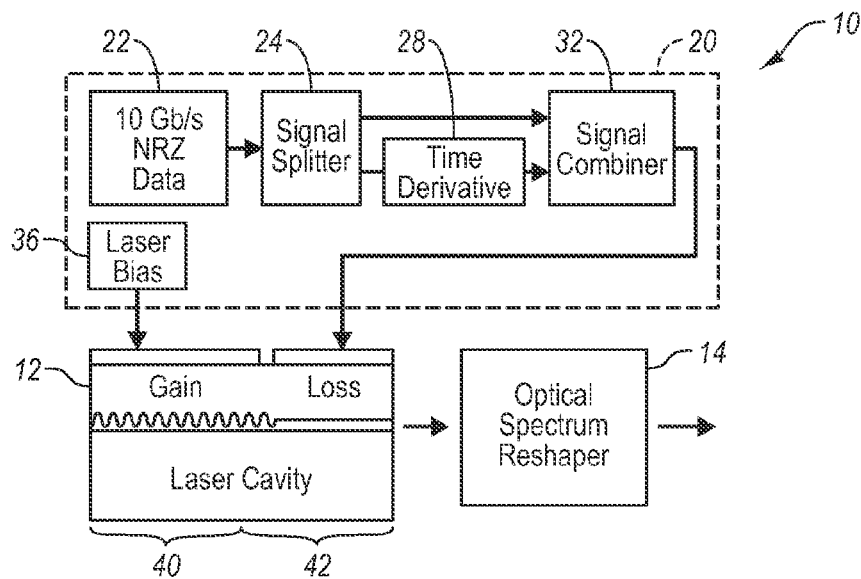
FIG. 5 is a schematic block diagram of another alternative embodiment of a control circuit and laser in accordance with an embodiment of the present invention.

Referring to FIG. 5, in another embodiment, the laser bias signal source 36 is coupled to a gain section 40 of the laser 12. The bias signal is preferably held at a substantially constant value, such that the laser operates well above its lasing threshold. The modulation signal, such as the output of the signal combiner 32, is coupled to a loss section 42 of the laser. The optical transmission loss in the laser cavity is modulated in proportion to a prescribed combination of the NRZ signal to be transmitted and a signal that represents time derivatives of the NRZ signal, so as to generate a desired combination of adiabatic chirp and artificial transient chirp in the laser output signal. A number of FM source using loss modulation, including intra-cavity loss modulation, have been disclosed in U.S. patent application Ser. No. 11/787,163, filed Apr. 13, 2007, and entitled "Optical FM Source Based on Intra-Cavity Phase and Amplitude Modulation in Lasers," which is incorporated herein by reference.

Figure 6:
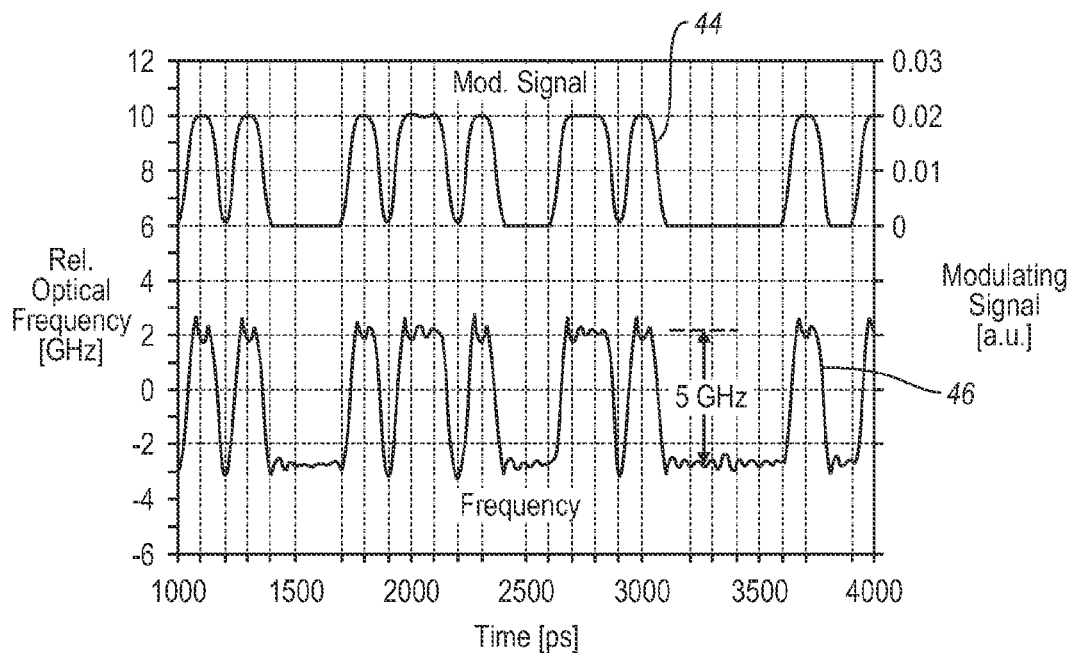
FIG. 6 is a plot of an uncompensated modulating signal and laser output.

In transmitters suitable for use in accordance with the present invention, the gain of the DFB laser (or alternatively, in the case of a loss-modulated laser of FIG. 5, the loss in the loss section of the laser cavity) is modulated in proportion to a time-varying digital signal S(t), which is typically in non-return-to-zero (NRZ) format. FIG. 6 shows an example of one such modulating signal 44 at a data rate of 10 Gb/s. It also displays the resulting frequency chirp in the output 46 of an OSR 14 receiving the modulated output of the laser 12, obtained through numerical simulation of a laser 12 and OSR 14 in which S(t) modulates the loss in the laser cavity.

Clearly, the frequency deviations in the laser output are substantially proportional to S(t), which indicates negligible transient chirp. Hence, in the absence of residual AM, the normalized optical amplitude of the laser output signal is simply given by $$a(t) = e^{j\phi(t)},$$

where $$\frac{\partial}{\partial t}\phi(t) = \omega(t)$$

denotes the relative angular optical frequency with $\omega(t) \propto S(t)$.

This frequency modulation is then converted into amplitude modulation by the OSR 14 having a frequency-dependent transfer function $$H_{filt}(\omega) = A + B\omega + C\omega^2 + D\omega^3 + \ldots,$$

whose shape and bandwidth have been disclosed in U.S. Pat. No. 7,054,538, entitled "Flat dispersion frequency discriminator," which is hereby incorporated by reference. One may describe the effects of the optical spectrum reshaper 14 in the time domain by the complex operator $$h_{filt}(t) = A - jB\frac{\partial}{\partial t} - C\frac{\partial^2}{\partial t^2} + jD\frac{\partial^3}{\partial t^3} + \ldots,$$

so that the amplitude at the output signal of the transmitter 10 is calculated according to:

$$h_{filt}(t)a(t) \approx a(t)[A + B\omega - jC\dot{\omega} + C\omega^2 - D\ddot{\omega}\omega - j3D\dot{\omega}\omega\omega + D\omega^3 + \ldots] \quad \text{Equation 1}$$

where $$\dot{\omega}(t) = \frac{\partial}{\partial t}\omega(t) \text{ and } \ddot{\omega}(t) = \frac{\partial}{\partial t}\dot{\omega}(t).$$

Figure 7:
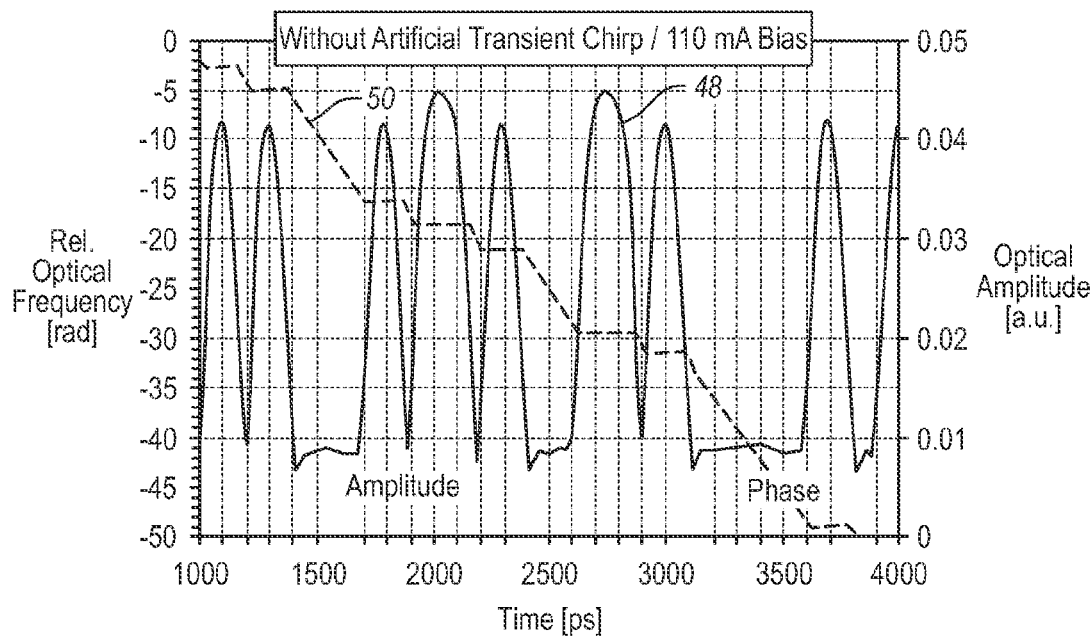
FIG. 7 is a plot of amplitude and phase of a laser output in response to an uncompensated modulating signal.

FIG. 7 displays the results of a numerical simulation of the amplitude 48 and phase variations 50 in this signal, in which it is assumed that the laser exhibits the same frequency chirp as shown in FIG. 6.

It is well known in the art that the frequency deviations of sufficiently small transient chirp are approximately proportional to the time derivative of the modulating signal. Therefore, artificial transient chirp may be generated in the laser output by adding a fixed amount of the time derivative of the NRZ signal to the modulating signal of the laser. Therefore, in a preferred embodiments of the invention, the laser 12 in the transmitter 10 is modulated with a pre-distorted signal of the form S(t)+αṠ(t), where $$\dot{S}(t) = \frac{\partial}{\partial t}S(t)$$

and α is a constant factor. It is well known to those skilled in the art that an electrical signal proportional to the time derivative Ṡ(t) can be generated by passing a portion of S(t) through a first order electrical high-pass filter, which may be a first-order Butterworth filter or a transversal electrical filter with two or more taps.

Figure 8:
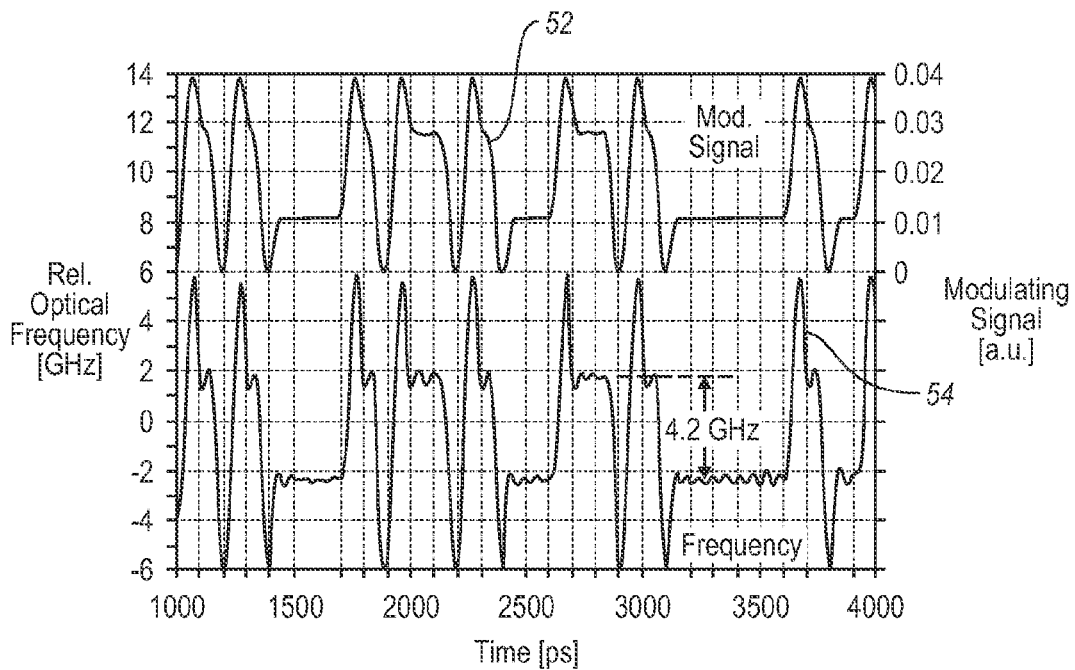
FIG. 8 is a plot of a pre-compensated modulating signal and corresponding laser output in accordance with an embodiment of the present invention.

FIG. 8 shows an example of such pre-distorted drive signal, including the amplitude 52 of the modulating signal and the amplitude 54 of the output of the laser 12, with α≈30 ps. FIG. 8 also shows the resulting frequency variations in the laser output signal, obtained by numerical simulations, in which it is assumed that S(t)+αṠ(t) modulates the propagation loss in the laser cavity. As can be clearly seen, the frequency deviations in the laser output 54 are substantially proportioned to the modulating signal S(t)+αṠ(t).

Therefore, the optical output signal of a laser modulated according to S(t)+αṠ(t) may be described by $$a_{pd}(t) = e^{j\phi_{pd}(t)}.$$

where $$\frac{\partial}{\partial t}\phi_{pd}(t) = \omega(t) + \alpha\dot{\omega}(t).$$

Figure 9:
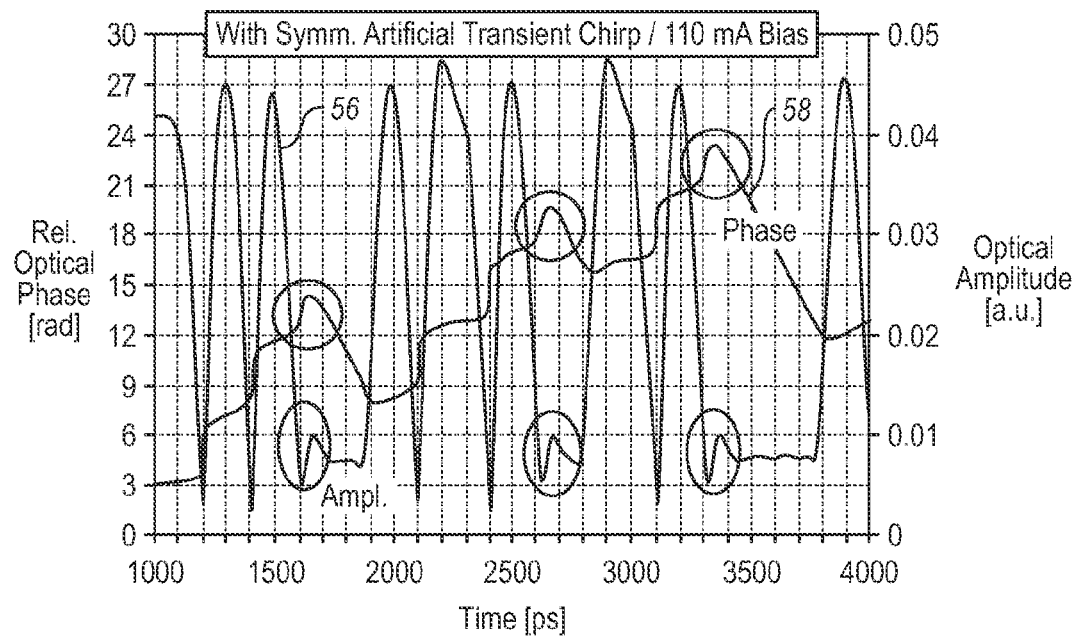
FIG. 9 is a plot of the amplitude and phase of a laser output modulated with a pre-compensated modulating signal in accordance with an embodiment of the present invention.

The optical spectrum reshaper 14 then converts this signal into a signal having an amplitude 56 and phase 58, as shown in FIG. 9, which is described by:

$$h_{filt}(t)a_{pd}(t) \approx \begin{bmatrix} A + B\omega - jC\dot{\omega} + C\omega^2 - D\ddot{\omega} - j3D\dot{\omega}\omega + \\ D\omega^3 + \ldots + B(\alpha\dot{\omega}) - jC(\alpha\ddot{\omega}) + 2C\omega(\alpha\dot{\omega}) + \\ C(\alpha\dot{\omega})^2 - j3D\dot{\omega}(\alpha\dot{\omega}) + \ldots \end{bmatrix} a_{pd}(t) \quad \text{Equation 2}$$

Experiments conducted by the inventors have found that the output signals of such pre-distorted transmitters in accordance with embodiments of the invention are very similar to the output signals of a conventional transmitter after having experienced negative GVD of about −2000 ps² in a dispersion-compensating module.

Figure 10:
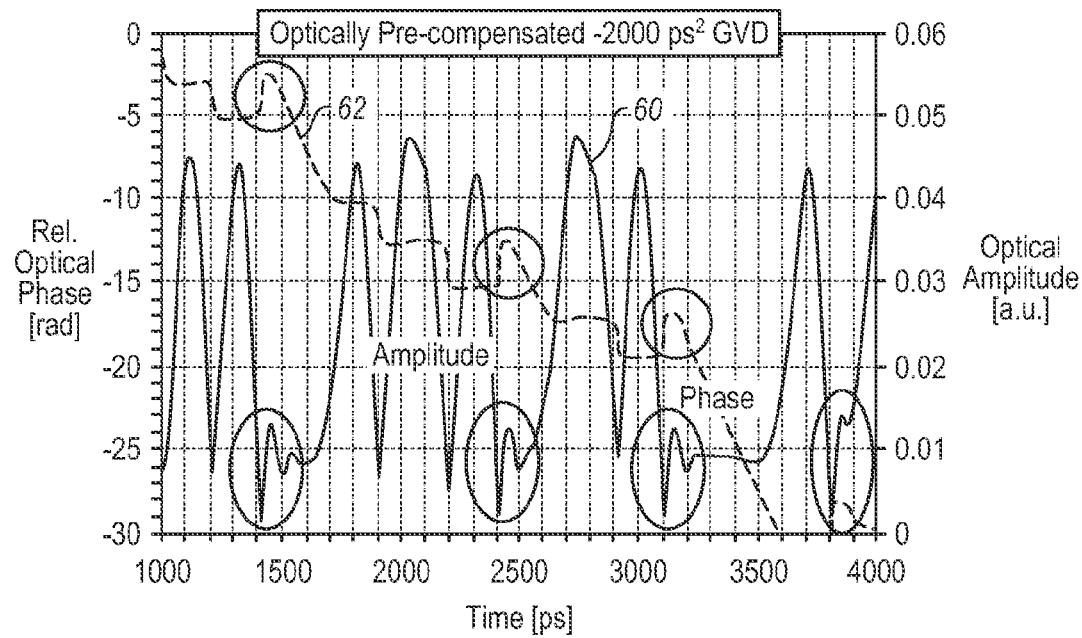
FIG. 10 is a plot of the amplitude and phase of an optically compensated optical signal.

An example of such optically pre-compensated signal, including the amplitude 60 and phase 62, is displayed in FIG. 10. Comparison of the amplitude and phase variations in the signals of FIGS. 9 and 10 reveals that both signals exhibit a substantial dip in their amplitudes 56, 60 at the falling edges of the NRZ pulses, especially when a digital '1' is followed by more than one digital '0'. Moreover, these dips are always accompanied by substantial bumps in the optical phase 58, 62 (as marked by circles in FIGS. 9 and 10). It should be noted that these features are substantially absent from the output signals of a conventional transmitter that have not experienced GVD, such as the amplitude 48 and phase 50 shown in FIG. 7.

The similarity between the pre-distorted signals of FIG. 7 and the optically pre-compensated signals of FIG. 8 can also be shown through mathematical analysis. GVD in a dispersion-compensating module can be described by a frequency-dependent transfer function $$H_{gvd}(\omega) = e^{(j\beta_2 L \omega^2/2)},$$

where $$\beta_2 L$$

denotes the accumulated GVD in the fiber. For sufficiently small values of $$|\beta_2 L \omega^2/2|$$

one may approximate $$H_{gvd\,as}H_{gvd}(\omega) \approx 1 + j\beta_2 L \omega^2/2.$$

so that in the time domain, one can approximate the effect of GVD on the transmitted signals by the operator $$h_{gvd}(t) \approx 1 - (j\beta_2 L/2)\frac{\partial^2}{\partial t^2}.$$

In this approximation, the output signal of a conventional transmitter after having experienced GVD becomes:

$$a(t)\begin{bmatrix} A + B\omega - jC\dot\omega + C\omega^2 - D\ddot\omega - j3D\dot\omega\omega + \\ D\omega^3 + \ldots + (A\beta_2 L/2)\dot\omega + j(A\beta_2 L/2)\omega^2 - \\ j(B\beta_2 L/2)\ddot\omega + 3(B\beta_2 L/2)\dot\omega\omega + \\ j(B\beta_2 L/2)\omega^3 + \ldots \end{bmatrix} \approx \quad \text{Equation 3}$$

$$\left\{ \begin{bmatrix} A + B\omega - jC\dot\omega + C\omega^2 - D\ddot\omega - \\ j3D\dot\omega\omega + D\omega^3 + \ldots \end{bmatrix} e^{j\beta_2 L\omega^2/2} + \\ (A\beta_2 L/2)\dot\omega - j(B\beta_2 L/2)\ddot\omega + \\ 3(B\beta_2 L/2)\dot\omega\omega + \ldots \right\} a(t)$$

With these expressions it can be easily shown that GVD not only introduces a phase shift of $$\beta_2 L\omega^2/2$$

in the optical output signals of the transmitter, but that it also produces additional terms that are proportional to $\dot\omega$ and $\ddot\omega$, respectively. Since $$|\beta_2 L\omega^2/2| \leq 0.37$$

for $$|\beta_2 L| \leq 3000 \text{ ps}^2$$

and $|\omega(t)/2\pi| \leq 2.5$ GHz, the predominant effect of GVD on the transmitted signal is described by the additional terms $$(A\beta_2 L/2)\dot\omega, -j(B\beta_2 L/2)\ddot\omega,$$

and $$(3B\beta_2 L/2)\dot\omega\omega,$$

which are proportional to the time derivatives of the modulating signal $\dot S(t)$ and $$\ddot S(t) = \frac{\partial}{\partial t}\dot S(t).$$

Furthermore, a comparison of Equations 2 and 3 reveals that the additional terms introduced by GVD in the output signals of a conventional transmitter exhibit a similar form as those introduced by modulating the transmitter with the pre-distorted signal. Indeed, one finds the following correlations of Equation 4 between the additional terms in Equations 2 and 3:

$$+A\beta_2 L/2)\dot\omega \leftrightarrow +B(\alpha\dot\omega)$$

$$-j(B\beta_2 L/2)\ddot\omega \leftrightarrow -jC(\alpha\ddot\omega)$$

$$+3B\beta_2 L/2)\dot\omega\omega \leftrightarrow +2C(\alpha\dot\omega)\omega \qquad \text{Equation 4}$$

It is easily verified that the two terms in the first row of Equation 4 are equal when $$\alpha = (\beta_2 L/2) A/B$$

and, furthermore, those in the second row when A/B=B/C. However, under these conditions the two terms in the third row in Equation 4 differ by a factor of 1.5. Nevertheless, for sufficiently small GVD, the pre-distorted output signals of Equation 2 are very similar to the output signals of Equation 3 from a conventional transmitter after having experienced negative GVD. Hence, it follows that the output signals of a pre-distorted transmitter modulated by $S(t)+\alpha\dot S(t)$ can tolerate substantially more GVD than the output signals of a conventional transmitter.

FIG. 11A displays results of numerical simulations of the dispersion tolerance of signals generated by a conventional transmitter. FIG. 11B displays results of numerical simulations of the dispersion tolerance of signals generated by a pre-distorted transmitter, in which the laser is modulated with the drive signals shown in FIG. 8. The curves in FIGS. 11A and 11B display the BER in the received signal as a function of OSNR after the signals have been transmitted through various lengths of standard single-mode fiber (SSMF) having GVD of 17 ps/nm/km. As expected, the signals generated by the conventional transmitter exhibit a dispersion penalty of about 1 dB after transmission through 200 km SSMF (i.e. after having experienced 3400 ps/nm accumulated GVD), whereas the signals generated by the pre-distorted transmitter (with $\alpha$=30 ps) do not show a significant penalty at after traversing 200 km SSMF. At longer transmission distances, the dispersion penalties are substantially smaller for signals generated by the pre-distorted transmitter than for those generated by the conventional transmitter. In fact, the signals generated by the pre-distorted transmitter exhibit a dispersion tolerance that is about 850 ps/nm (or ~1000 ps$^2$) higher than those generated by the conventional transmitter. It should be noted that the dispersion tolerance of the signals from the pre-distorted transmitter are optimized by reducing the peak-to-peak frequency deviation of the adiabatic frequency chirp in the DFB laser to only 4.2 GHz (c.f. FIG. 8), which is substantially smaller than 5-GHz peak-to-peak frequency deviations in the conventional transmitter.

However, the dispersion tolerance of the pre-distorted signals is still substantially smaller than that expected from the relation $$\beta_2 L \approx 2\alpha B/A$$

in Equation 4. This discrepancy can be attributed to undesired additional terms that appear in Equation 2 but are not found in Equation 3, i.e. the terms $$C(\alpha\dot{\omega})^2$$

and $j3D\dot{\omega}(\alpha\dot{\omega})$. The term $$C(\alpha\dot{\omega})^2,$$

for instance, is always either positive or negative (depending on the sign of C) and, hence, can substantially offset the effects of the desired term $B(\alpha\dot{\omega})$ in Equation 2.

For this reason, it is advantageous to pre-distort the modulating signal of the laser only over certain time intervals. Numerical simulations have shown that the dispersion tolerance of the signals further improves when the time derivative a $\alpha\dot{S}(t)$ is added to S(t) only near the falling edges of S(t) as shown in FIG. 10. Such asymmetric pre-distortion of the modulating signals generates artificial transient chirp only at the falling edges of the NRZ pulses, i.e. when $\dot{S}(t)$ is negative, and is therefore referred to as negative-only transient chirp.

Figure 13A:
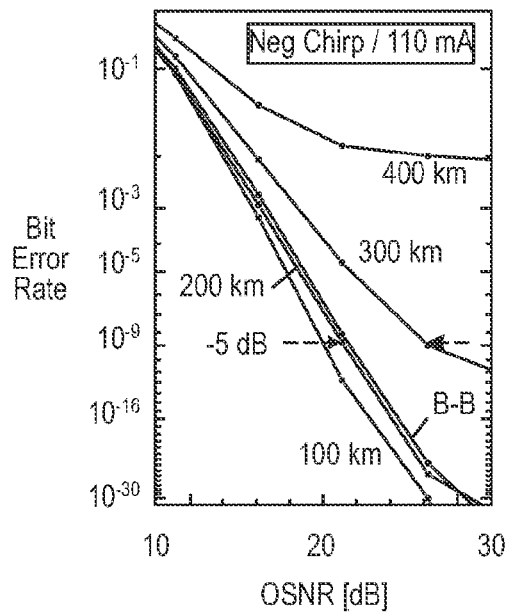
FIGS. 13A and 13B are plots relating the bit error rate of modulating signals having differing bias levels in accordance with an embodiment of the present invention.

Numerical simulations with such asymmetrically pre-distorted signals reveal that their dispersion tolerance is about 1000 ps/nm (or ~1200 ps$^2$) higher than that of signals from a conventional transmitter. As can be seen in FIG. 13, the dispersion penalty of pre-distorted signals with negative-only transient chirp is even negative after transmission through 100 km SSMF and vanishes after transmission through 200 km SSMF. Even after transmission through 300 km SSMF (corresponding to 5100 ps/nm GVD) the dispersion penalty is only 5 dB. Again, the peak-to-peak frequency deviation of the adiabatic chirp in the CML transmitter is reduced here to about 4.3 GHz to maximize the dispersion tolerance of the signals, as illustrated by the modulating signal 64 and laser output signal 66 shown in FIG. 12.

Figure 13B:
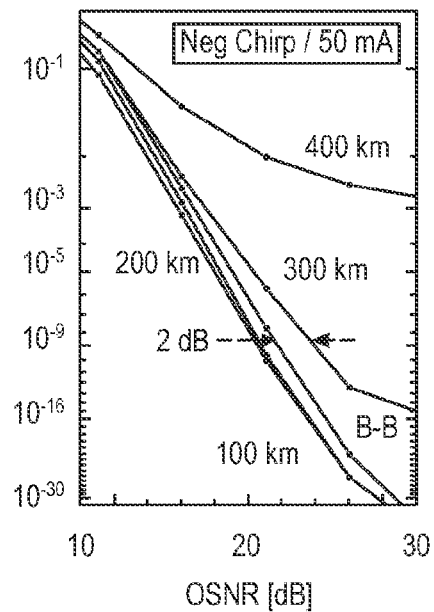
Figure 14:
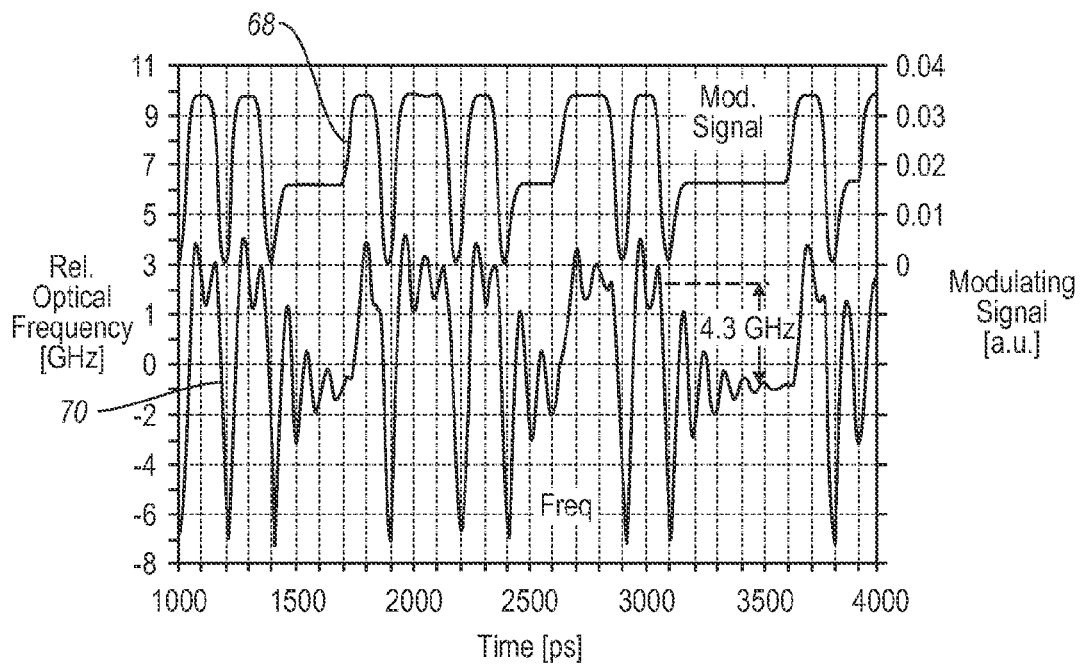
FIG. 14 is a plot showing a modulating signal with reduced bias and a corresponding laser output with a ringing component in accordance with an embodiment of the present invention.

Furthermore, operating the laser closer to threshold increases the dispersion tolerance of such asymmetrically pre-distorted signals even further. This can be accomplished, for example, by reducing the bias current applied to the active gain medium from 80 mA, as assumed in FIG. 13A, to only 50 mA, as assumed in FIG. 13B. As shown in FIG. 14, in this mode of operation, a modulating signal 68 causes a laser output 70 to exhibit significant 'ringing' in its output frequency, especially at those times when $\dot{S}(t)$ is added to the modulating signal.

The ringing in the frequency response arises from natural transient chirp, which is substantially larger when the laser operated close to threshold. However, this combination of artificial and natural transient chirp improves the dispersion tolerance of the optical signals by about 1200 ps/nm (~1400 ps$^2$), as shown in FIG. 13B. Hence, such pre-distorted signals can be transmitted over 270 km SSMF (i.e. ~4600 ps/nm accumulated GVD) with a dispersion penalty of less than 1 dB. Even after transmission through 300 km SSMF the dispersion penalty does not exceed 2 dB.

Figure 15:
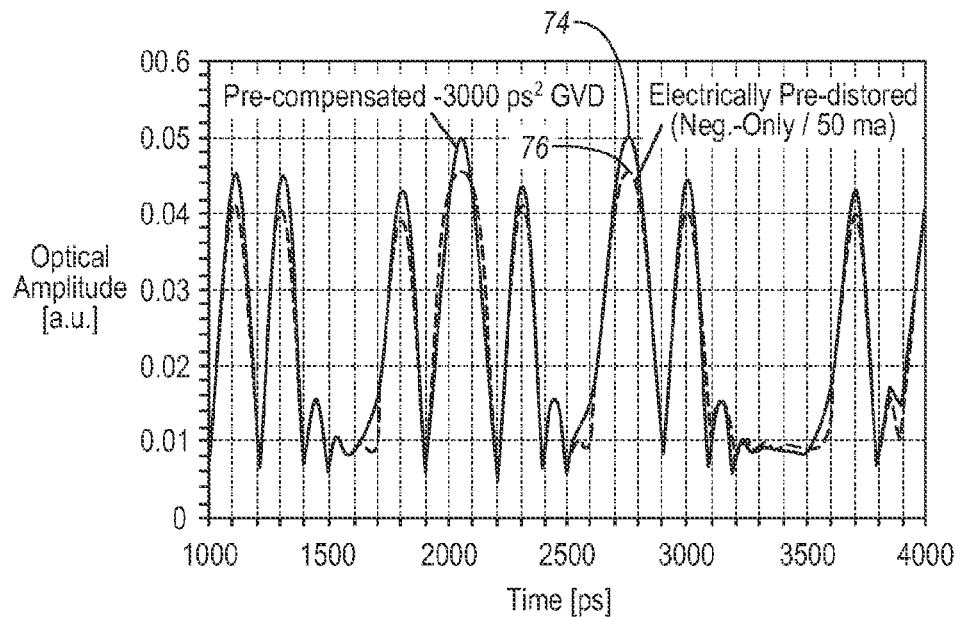
FIG. 15 is a plot relating the amplitude of an optically compensated optical signal to the amplitude of an electrically pre-compensated laser output in accordance with an embodiment of the present invention.

The reason for this improved dispersion tolerance may be explained with reference to FIG. 15. The ringing in the frequency response of the laser causes a similar but smaller ringing in the output amplitude 74 of the transmitter near the falling edges of the pulses, as shown in FIG. 15, which is very similar to the amplitude ringing observed in signals 76 from conventional transmitters that are optically pre-compensated with −3000 ps$^2$ GVD. This can be clearly seen in FIG. 15, where the amplitude variations of the signals 74 from the pre-distorted transmitter are compared with signals 76 from the pre-compensated conventional transmitter.

It should be noted that the ringing in the frequency response of the laser shown in FIG. 14 may also be generated artificially by proper pre-distortion of the modulating signal of the laser. It is well known to those skilled in the art that artificial ringing in the modulating electrical signal can be generated by passing a portion of S(t) through a suitable higher order electrical filter or resonator and then adding the this signal to S(t). Equivalently, one may add a prescribed combination of first and higher order derivatives of S(t) with varying delays to the modulating signal of the laser.

The bit error rate of a digital signal is given by the sum of the bit error rate of the individual bits times the probability of the occurrence of the bit. The degradation of the BER of a digital signal after fiber transmission is typically determined by a series of limiting bit sequences such as 101, 010, 0110, 1001, etc. It is useful to group the bits in this way because fiber dispersion tends to cause distortion and interference of adjacent bits. In other words, fiber dispersion introduces memory in the system such that the shape of each bit after transmission will be a function of adjacent bits. The bit "memory," introduced by the fiber dispersion is determined by the length fiber and amount of dispersion, and is on the order of $$M = P\Delta v/T \qquad \text{Equation 5}$$

where P is equal to the length of a fiber in kilometers multiplied by its dispersion in ps$^2$/km, $\Delta v$ is the largest frequency deviation in the spectrum of the signal, and T is the bit period. For optical paths formed of multiple spans of fiber including erbium doped fiber amplifiers (EDFA) and dispersion compensating fiber (DCF), P is calculated by summing the product of length times dispersion for all spans forming the optical path between a transmitter and a receiver. For example, for a 10 Gb/s NRZ signal having a frequency excursion of 5 GHz, the fiber memory after 200 km is 1.4 bits, whereas it increases to 5 bits for 600 km.

Figure 16:
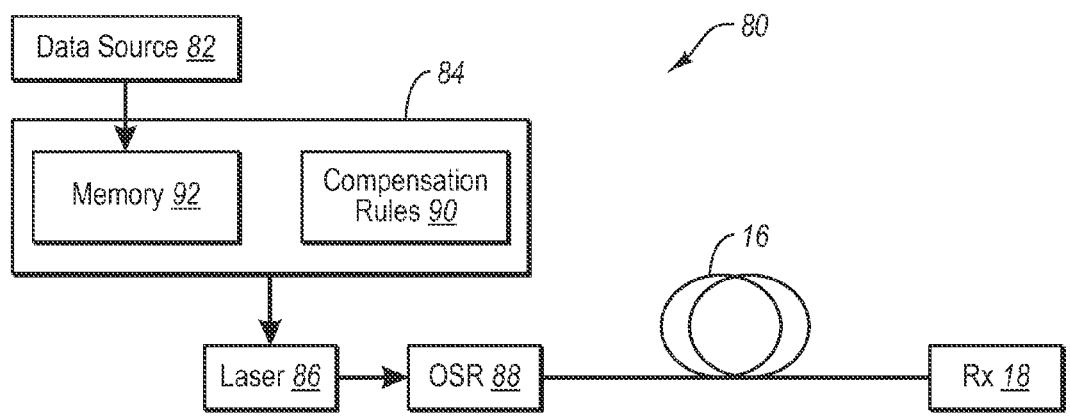
FIG. 16 is a schematic block diagram of a transmitter in accordance with an embodiment of the present invention.

Referring to FIG. 16, In some embodiments of the invention, the pulse shape of each bit is a function of multiple adjacent bits in order to compensate for fiber memory. In the illustrated embodiment, a transmitter 80 includes a digital data source 82, a digital signal processor (DSP) 84, a frequency modulated laser 86, and an optical spectrum reshaper (OSR) 88. The OSR 88 couples optical signals to the optical fiber 16, which is coupled to the receiver 18. The input digital signal is processed by the DSP 84 based on a set of compensation rules 90 either stored in the DSP or input to the DSP 84 from another device. The compensation rules 90 determines some or all of the rise time, fall time, bit edge, transient chirp for 1→0 and 0→1 transitions, and the amplitude of individual bits based on a sequence of bits, or "bit window" that includes the individual bit.

The DSP 84 preferably has an n bit memory 92 so as to match or exceed the estimated memory of the fiber for which the transmitter 80 is to be used. For example, for a 360 reach in single mode fiber with 17 ps/nm/km dispersion, a 1 bit DSP memory (n=1) is sufficient. For longer reach of 400 or 600 km, n=2-5. The DSP rules are arranged to minimize the bit error rate of the signal after fiber transmission. The memory 92 may be embodied as a serial in, parallel out (SIPO) shift register that receives a serial data stream from the data source 82 and is accessible by the DSP to evaluate each bit simultaneously with adjacent bits stored in the register.

For example, for a 101 sequence, the drive signal is arranged to ensure that the phase difference between the 1 bits is near it or an odd multiple of π as discussed in U.S. patent application Ser. No. 11/068,032. The signal out of the DSP 84 generates a frequency modulated signal from the laser 86, which may have additional transient chirp at the bit transitions due to the relaxation oscillation in the laser cavity. The phase difference between the 1 bits is given by the integral of the chirp between the two bits. The driver rule may therefore be set to take into account the transient chirp in order to generate the required phase difference. The phase difference between the two desired bits can be between π/2 and 3π/2 and still produce some desired destructive interference. However the preferred value is π. As a specific example the output of the driver can generate a simple square shape pulse without enhancements at the transition edges (i.e. without enhanced transient chirp) such as to generate an adiabatic chirp frequency of the order of one half the bit rate; e.g. 5 GHz chirp for 10 Gb/s NRZ signal. Adiabatic chirp may be defined as the frequency difference between a base (or zero) frequency and a peak (or one) frequency in the output of the laser.

The DSP 84 may be programmed to cause the phase difference between 1 bits separated by even number of 0 bits to be an odd integer multiple of π. This may be done in instances where n≧2. As an example, given an input 1001 sequence, the DSP 84 can output a square pulse shape without enhanced transient edges such that the adiabatic chirp out of the laser 86 is 7.5 GHz. The phase difference between two 1 bits separated by 2 zero bits for a 10 Gb/s signal is given by $\Delta\phi=2\pi\times200$ ps×$\Delta v=3\pi$; setting the adiabatic chirp to 7.5 GHz achieves a 3π phase shift. Stated generically, the adiabatic chirp may be equal to about 0.75 times the bit rate of the data stream from the digital data source 82. The choice of a 3π phase difference rather than it may advantageously permit a larger amplitude modulation of the 1 bits relative to the 0 bits. Inasmuch as the 0 bit frequency will be lower than the 1 bit frequency, the OSR 88 may attenuate the 0 bit frequency more effectively relative to the 1 bit frequency, which carries the information. The OSR 88 advantageously allows one to cause a desired frequency profile to obtain the desired phase difference between bits without having to generate an undesirable amplitude modulation at the output of the transmitter. The output of the transmitter 80 will therefore remain, for the most part, a simple NRZ signal with high extinction ratio.

For distances greater than 360 km, the 0110 pattern is typically a limiting sequence. The DSP 84 may be programmed to generate a drive signal in response to the 0110 bit sequence in order to compensate for compression of the 1 bits due to dispersion. The DSP 84 may be programmed to introduce a symmetric transient chirp to the edges of the 1 1 sequence: a large blue shifted chirp at the first 0→1 transition and a large red chirp at the 1→0 transition. This causes the 1 1 pulse to spread slightly into the adjacent 0 bits, compensating for narrowing caused by dispersion. Assuming that the phase difference between these 1 bits and adjacent 1 bits separated by odd or even number of 0 bits is set to an odd multiple of π by the other DSP rules discussed above, this will cause destructive interference and keep the 1 1 bit sequence in the proper time slot. The amplitude of the output of the driver to generate the enhanced transient chirp will be determined by the FM efficiency of the laser and its relaxation oscillation frequency which is a known function of bias of the laser.

In some embodiments, the rise time and fall time of pulses generated by the DSP may also be a function of adjacent bits in order to compensate for fiber memory. For example, as discussed in U.S. Pat. No. 7,356,264, increasing the rise time of an optical digital signal decreasing the fall time of the drive signal using a pre-distortion circuit can increase the reach of signal from the disclosed laser transmitter. This is because the adiabatic chirp of pulses tends to stretch the falling edge trail of a 1→0 transition while it hastens the 0→1 transition. Using the reverse of this asymmetry at the driver produces a more symmetric eye diagram and therefore a lower bit error rate.

Figure 17:
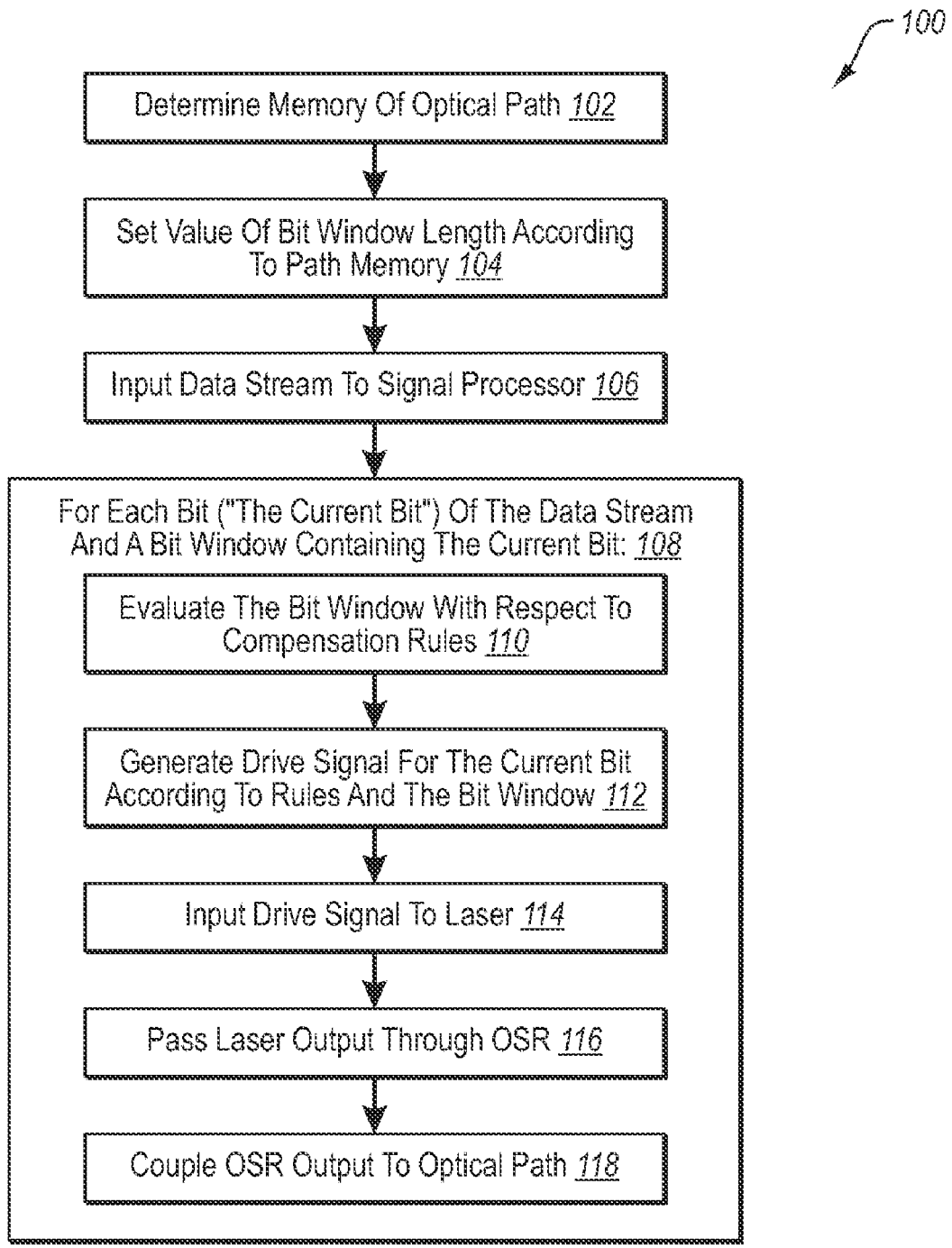
FIG. 17 is a process flow diagram of a method for transmitting data over an optical channel in accordance with an embodiment of the present invention.

Referring to FIG. 17, a method 100 for transmitting data over an optical path, such as one or more spans of fiber either with or without use of repeaters or EDFA, may include determining a memory of the optical path at step 102. The memory may be determined experimentally or calculated based on known attributes of the optical path. The memory may be calculated according to Equation 5 above. At step 104, the value of a bit window length is set according to the bit memory calculated at step 102. The bit window length may be equal or greater than the memory. In some embodiments, it may be equal to double the memory. In such embodiments, the bit window may include bits on either side of a bit currently being processed by the DSP. At step 106, a data stream is input into a signal processor, such as a DSP. A method 108 may then be executed for each bit ("the current bit") in the data stream. A bit window is defined as a range of bits including the current bit and having the length calculated at step 104. The position of the current bit within the bit window may depend on the optical channel. In some embodiments, the output corresponding to each current bit is a function of previous bits such that the current bit would be the most recent bit in the bit window. In other embodiments, the current bit is located at or immediately adjacent a middle position in the bit window where the output corresponding to each bit is a function of preceding and following bits.

The method 108 may include evaluating the bit window with respect to compensation rules at step 110, such as the compensation rules described hereinabove for specific limiting bit sequences. At step 112 a drive signal is generated for the current bit according to the evaluation at step 110. At step 114, the drive signal is input to a laser to generate a frequency modulated signal. The output of the laser may also be somewhat amplitude modulated. At step 116, the output of the laser is passed through an optical spectrum reshaper (OSR) operable to convert frequency modulation in the output of the laser into amplitude modulation. For example, the OSR may have an extinction ratio that is between 7 and 10 dB higher than the output of the laser. At step 118 the output of the OSR is coupled to the optical path.

Figure 18:
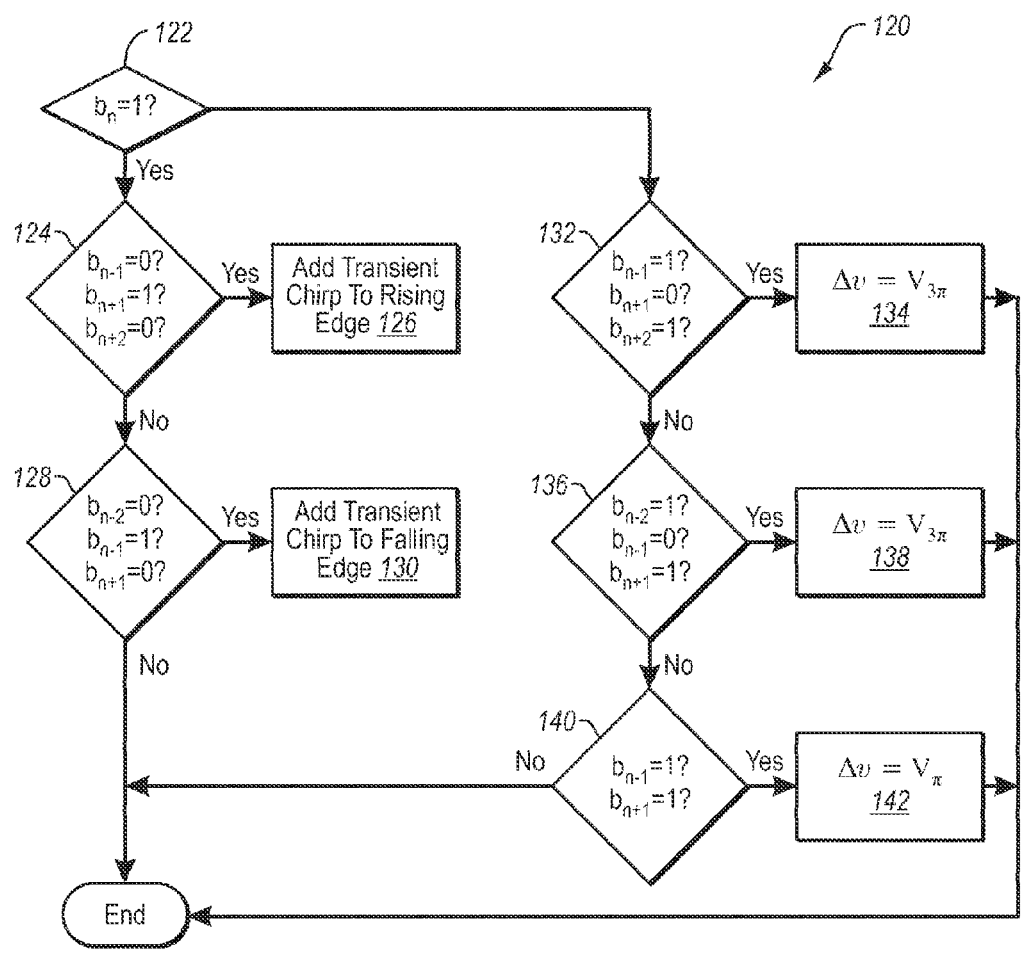
FIG. 18 is a process flow diagram illustrating the application of compensation rules to a digital signal in accordance with an embodiment of the present invention.

Referring to FIG. 18, in some embodiments, the compensation rules may be applied according to the illustrated method 120. At step 122, the current bit ($b_n$) is evaluated. If it is a one bit, then adjacent bits are evaluated at step 124 to determine if $b_{n-1}=0$, $b_{n+1}=1$, and $b_{n+2}=0$. If so, then transient chirp will be added to the rising edge of the pulse corresponding to bit at step 126. If not, then at step 128, adjacent bits are evaluated to determine if $b_{n-2}=0$, $b_{n-1}=1$, and $b_{n+1}=0$. If so, then transient chirp will be added to the falling edge of the pulse corresponding to the bit at step 130.

If the current bit is not a zero bit, then at step 132, adjacent bits are evaluated to determine if $b_{n-1}=1$, $b_{n+1}=0$, $b_{n+2}=1$. If so, then the output voltage generated at step 134 during the current bit will be effective, in combination with the following 0 bit, to cause the phase difference between the 1 bits on either side of the 0 bits to be equal to 3π in the output of the laser. In some embodiments, this may include generating an output voltage during the time slot corresponding to the current bit that is less than the 1 bit frequency by an amount about (+/−10%) equal to 0.75 times the bit rate of the input data stream. The 1 bit frequency may be defined as the frequency containing the most optical power in the portion corresponding to the 1 bit in the frequency spectrum of the output of the laser.

If the conditions of step 132 are not met, then at step 136, adjacent bits are evaluated to determine if $b_{n-2}=1$, $b_{n-1}=0$, and $b_{n+1}=1$. If so, then the output voltage at step 138 during the current bit will be effective, in combination with the previous 0 bit, to cause the phase difference between the 1 bits on either side of the 0 bits to be equal to 3π in the output of the laser. As noted above, this may include causing the 0 bit frequency to be less than the 1 bit frequency by about 0.75 times the bit rate.

If the conditions of step 136, are not met, then at step 140, adjacent bits are evaluated to determine if $b_{n-1}=1$ and $b_{n+1}=1$. If so, then the output voltage at step 142 during the current bit will be effective to cause the phase difference between the 1 bits on either side of the 0 bit to be equal to it in the output of the laser. This may be accomplished by causing the 0 bit frequency to be less than the 1 bit frequency by an amount about (+/−10%) equal to 0.5 times the bit rate. In some embodiments, steps 140 and 142 are omitted and the adiabatic chirp between the 1 bit and 0 bit frequencies may be equal to about 0.5 times the bit rate, unless another value is chosen during steps 134 and 138.

Figure 19:
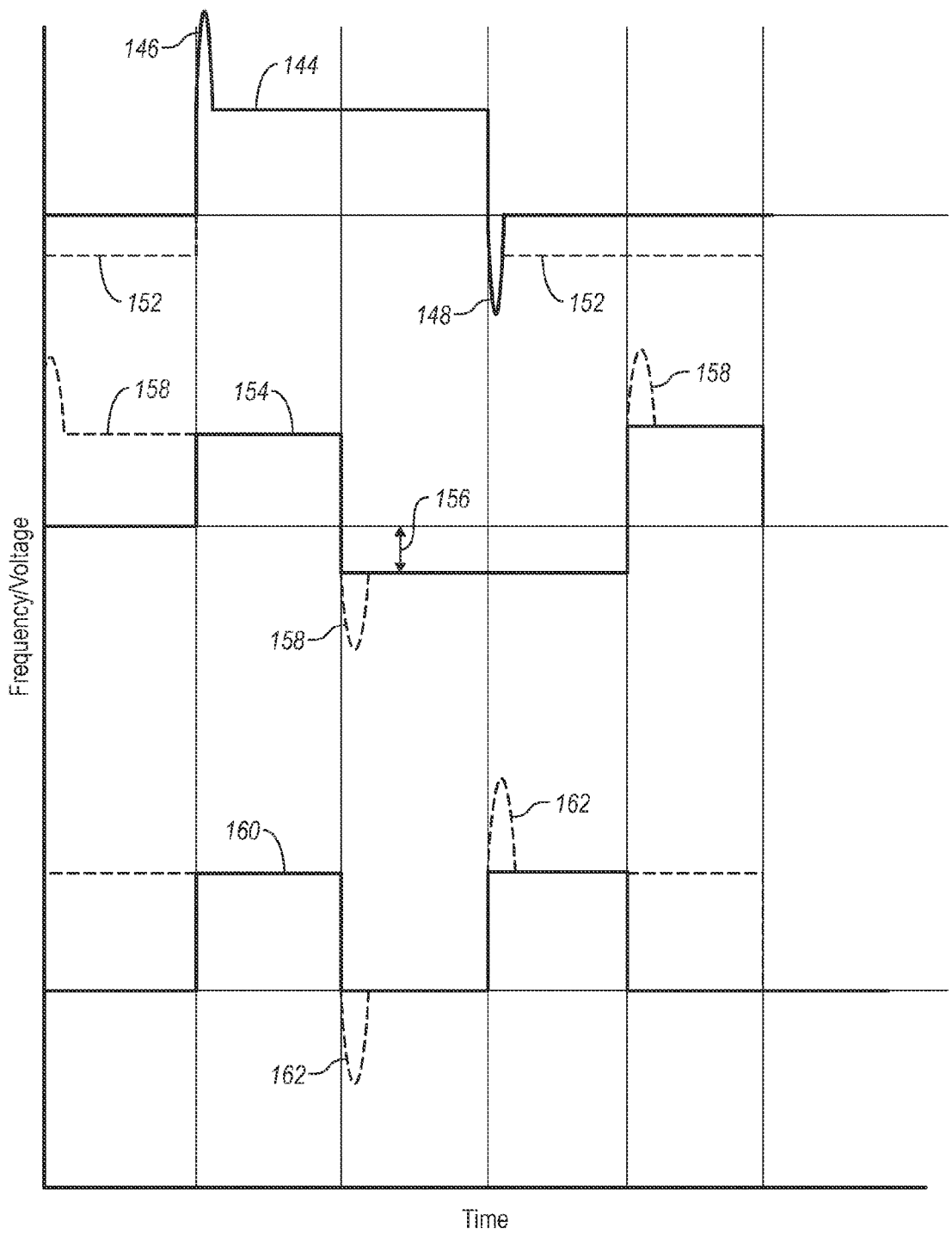
FIG. 19 illustrates a compensated drive signal in accordance with an embodiment of the present invention.

Referring to FIG. 19, output pulses generated according to the above-described methods may have the illustrated form. The output pulses shown correspond to the voltage output of the DSP. However, the frequency of the laser will approximate the illustrated pulse shapes. As shown by line 144, the 0110 bit sequence includes a voltage peak 146 causing blue transient chirp on the rising edge of the 0→1 transition and a voltage trough 148 causing large red transient chirp at the 1→0 transition. The difference between the peak transient chirp and the 1 bit frequency and the difference between the trough transient chirp and the 0 bit frequency may depend on the fiber memory, which is in turn dependent on the length of fiber the signal must traverse. For distances less than 100 km, the amount of transient chirp will be low, e.g. less than 3 GHz for a 10 Gb/s signal. For distances greater than 500 km, the amount of transient chirp will be greater. As an example, the transient chirp on the rising edge may be greater than 50% of the frequency difference between the 0 bit frequency and the 1 bit frequency. The transient chirp on the falling edge may be greater than 50-100% of the frequency difference between the 0 bit frequency and the 1 bit frequency. These values may also apply to transient chirp applied according to the methods of FIGS. 1 through 15.

As shown by dotted lines 152, the 0 voltage may be reduced where one of the initial and final 0s of the 0110 sequence are also part of a 1001 sequence. In some embodiments, the trough of the transient chirp on the falling edge may be determined based on the reduced frequency 0 bit in such instances.

The output voltage for the 1001 sequence is shown by line 154. As is apparent from the Figure, the 0 bit voltage is reduced by an amount 156 relative to other bit sequences, such as the 101 sequence, such that the difference between the 0 bit frequency and the and the 1 bit frequency in the output of the laser will be about equal to 0.75 times the bit rate. As shown by dotted lines 158, in instances where the is of the 1001 sequence are part of a 0110 sequences, voltage peaks effective to cause blue transient chirp=may be added to the rising edge of the 0→1 transition and voltage troughs effective to cause large red transient chirp may be added at the 1→0 transition.

The 101 sequence is shown by line 160. As discussed hereinabove, the 0 voltage for the 101 sequence is chosen such that the 1 bits in the output of the laser will be it out of phase. This may be accomplished by selecting a 0 voltage relative to the 1 voltage that will cause the difference between the corresponding 0 frequency and 1 frequency to be about equal to 0.5 times the bit rate. The 1s of the 101 sequence may also be part of adjacent 0110 and 1001 sequences. Accordingly, As shown by dotted lines 162, in instances where the 1s of the 1001 sequence are part of a 0110 sequences, voltage peaks effective to cause blue transient chirp=may be added to the rising edge of the 0→1 transition and voltage troughs effective to cause large red transient chirp may be added at the 1→0 transition.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for transmitting optical signals comprising:
   a digital data source;
   an optical signal source; and
   a driving circuit coupled to the optical signal source and operable to convert a data signal into a drive signal provided to the optical signal source;
   wherein:
   the driving circuit is configured to receive a data stream from the digital data source;
   the driving circuit is configured to generate for each bit in the data stream a pulse having a shape that is a function of an n-bit window in the data stream including the bit;
   the n-bit window has a length n;
   n is an integer greater than $P\Delta v/T$;
   P is the sum of dispersion times length for all portions of an optical channel coupled between the optical signal source and an optical receiver, in picoseconds squared;
   $\Delta v$ is the largest frequency deviation in the spectrum of an optical signal output from the optical signal source; and
   T is the bit period, in picoseconds, of the data stream.

2. The apparatus of claim 1, wherein the optical channel has a length of 400 km and n is greater than or equal to two.

3. The apparatus of claim 1, wherein the optical channel has a length of 600 km and n is greater than or equal to five.

4. The apparatus of claim 1, wherein the optical signal source includes a laser optically coupled to an optical spectrum reshaper, and wherein the optical spectrum reshaper is configured to convert frequency modulation of the optical signal to amplitude modulation.

5. The apparatus of claim 1, wherein the driving circuit is configured to generate a pulse effective to induce transient chirp in the output of the optical signal source, the transient chirp being a function of the n-bit window.

6. An apparatus for transmitting optical signals comprising:
   a digital data source;
   an optical signal source; and
   a driving circuit coupled to the optical signal source and operable to convert a data signal into a drive signal provided to the optical signal source;
   wherein:
   the driving circuit is configured to receive a data stream from the digital data source;
   the driving circuit is configured to generate for each bit in the data stream a pulse having a shape that is a function of an n-bit window in the data stream including the bit;
   the optical signal source is configured to output a frequency modulated signal corresponding to the drive signal; and the driving circuit is configured to generate a phase relationship between one bits in the frequency modulated signal, the phase relationship being a function of the n-bit window.

7. An apparatus for transmitting optical signals comprising:
   a digital data source;
   an optical signal source; and
   a driving circuit coupled to the optical signal source and operable to convert a data signal into a drive signal provided to the optical signal source;
   wherein:
      the driving circuit is configured to receive a data stream from the digital data source;
      the driving circuit is configured to generate a pulse effective to cause the optical signal source to output an optical signal having enhanced blue shifted transient chirp on a 0 to 1 transition of a 0110 bit sequence of the data stream;
      the driving circuit is configured to generate a pulse effective to cause the optical signal source to output an optical signal having enhanced red shifted transient chirp on a 1 to 0 transition of a 0110 bit sequence of the data stream; and
      the 0 to 1 transition includes a transition from a base frequency to a peak frequency and wherein the blue shifted transient chirp is greater than 50 percent of the frequency difference between the base and peak frequency.

8. The apparatus of claim 7, wherein the 1 to 0 transition includes a transition from a peak frequency to a base frequency and wherein the red shifted transient chirp is greater than 50 percent of the frequency difference between the base and peak frequency.

9. The apparatus of claim 7, wherein the driving circuit is configured to generate a pulse effective to cause the optical signal source to output an optical signal having:
   a 1 to 0 transition between a peak frequency and a base frequency in a 1001 bit sequence, wherein the difference between the peak frequency and the base frequency is about equal to 0.75 times a bit rate of the data stream; and
   a 0 to 1 transition between a base frequency and a peak frequency in a 1001 bit sequence, wherein the difference between the peak frequency and the base frequency is about equal to 0.75 times a bit rate of the data stream.

10. A method for transmitting optical signals comprising:
    determining a memory of an optical channel;
    setting a bit window length according to the memory of the optical channel;
    inputting a data stream to a signal processor; and
    for each bit, hereinafter referred to as the current bit, and a bit window containing the current bit and having the bit window length in the data stream:
       comparing the bit window to a plurality of compensation rules;
       generating a drive signal for the current bit according to the plurality of compensation rules and the bit window;
       inputting the drive signal to a laser; and
       coupling an output of the laser to the optical channel,
    wherein the bit window length is equal to an integer n that is greater than $P\Delta v/T$, where P is the sum of dispersion times length for all portions of the optical channel, in picoseconds squared, between an optical receiver and the laser, $\Delta v$ is the largest frequency deviation in the spectrum of the output of the laser and T is the bit period, in picoseconds, of the data stream.

11. The method of claim 10, wherein the optical channel has a length of 400 km and n is greater than or equal to two.

12. The method of claim 10, wherein the optical channel has a length of 600 km and n is greater than or equal to five.

13. The method of claim 10, wherein coupling an output of the laser to the optical channel comprises passing the output of the laser through an optical spectrum reshaper, the optical spectrum reshaper converting frequency modulation in the output of the laser to amplitude modulation.

14. The method of claim 10, wherein generating a drive signal for the current bit according to the plurality of compensation rules and the bit window comprises:
    generating a pulse effective to cause the laser to output an optical signal having enhanced blue shifted transient chirp on a 0 to 1 transition of a 0110 bit sequence; and
    generating a pulse effective to cause the laser to output an optical signal having enhanced red shifted transient chirp on a 1 to 0 transition of a 0110 bit sequence.

15. The method of claim 14, wherein the 0 to 1 transition includes a transition from a base frequency to a peak frequency and wherein the blue shifted transient chirp is greater than 50 percent of the frequency difference between the base and peak frequency; and
    wherein the 1 to 0 transition includes a transition from a peak frequency to a base frequency and wherein the red shifted transient chirp is greater than 50 percent of the frequency difference between the base and peak frequency.

16. The method of claim 10, wherein generating a drive signal for the current bit according to the plurality of compensation rules and the bit window comprises:
    generating a pulse effective to cause the laser to output a 1 to 0 transition between a peak frequency and a first base frequency and a 0 to 1 transition between the peak frequency and the first base frequency in a 1001 bit sequence, wherein the difference between the peak frequency and the first base frequency is about equal to 0.75 times a bit rate of the data stream; and
    generating a pulse effective to cause the laser to output a 1 to 0 transition between a peak frequency and a second base frequency and a 0 to 1 transition between the peak frequency and the second base frequency in a 101 bit sequence, wherein the difference between the peak frequency and the second base frequency is about equal to 0.5 times a bit rate of the data stream.

17. The apparatus of claim 6, wherein the optical channel has a length of 400 km and n is greater than or equal to two.

18. The apparatus of claim 6, wherein the optical signal source includes a laser optically coupled to an optical spectrum reshaper, and wherein the optical spectrum reshaper is configured to convert frequency modulation of the optical signal to amplitude modulation.

19. The apparatus of claim 6, wherein the driving circuit is configured to generate a pulse effective to induce transient chirp in the output of the optical signal source, the transient chirp being a function of the n-bit window.

* * * * *